US009067320B2

(12) United States Patent
Beardsley et al.

(10) Patent No.: US 9,067,320 B2
(45) Date of Patent: Jun. 30, 2015

(54) ROBOTIC TEXTURE

(75) Inventors: Paul Beardsley, Zurich (CH); Javier Alonso Mora, Zurich (CH); Andreas Breitenmoser, Zurich (CH); Federico Perazzi, Bergamo (IT); Alexander Hornung, Zurich (CH)

(73) Assignee: Disney Enterprises, Inc., Burbank, CA (US)

( * ) Notice: Subject to any disclaimer, the term of this patent is extended or adjusted under 35 U.S.C. 154(b) by 530 days.

(21) Appl. No.: 13/458,875

(22) Filed: Apr. 27, 2012

(65) Prior Publication Data

US 2012/0206473 A1 Aug. 16, 2012

Related U.S. Application Data

(63) Continuation-in-part of application No. 13/156,212, filed on Jun. 8, 2011, now Pat. No. 8,723,872.

(60) Provisional application No. 61/363,154, filed on Jul. 9, 2010, provisional application No. 61/353,179, filed on Jun. 9, 2010.

(51) Int. Cl.
G09G 5/00 (2006.01)
B25J 9/16 (2006.01)
G06T 11/00 (2006.01)

(52) U.S. Cl.
CPC ............. *B25J 9/1666* (2013.01); *G06T 11/001* (2013.01)

(58) Field of Classification Search
None
See application file for complete search history.

(56) References Cited

PUBLICATIONS

M. Anthony Lewis et al., High Precision Formation Control of Mobile Robots Using Virtual Structures, 1997 Kluwer Academic Publishers, Autonomous Robots 4, pp. 387-403.*
James McLurkin et al., Speaking Swarmish: Human-Robot Interface Design for Large Swarms of Autonomous Mobile Robots, AAAI Spring Symposium, Mar. 28, 2006.*
Marco Mamei et al., Experiments of Morphogenesis in Swarms of Simple Robots, Applied Artificial Intelligence: An International Journal vol. 18, Issue 9-10, 2004, pp. 903-919.*
Alonso-Mora, J., Breitenmoser, A., Rufli, M., Siegwart, R., and Beardsley, P., "Multi-robot system for artistic pattern formation"., In Int. Conf. 2011, Robotics and Automation, 6 pages.
Alonso-Mora, J., Breitenmoser, A., Rufli, M., Beardsley, P., and Siegwart, R., "Optimal reciprocal collision avoidance for multiple non-holonomic robots". In Proc. Int. Symp. 2010 on Distributed Autonomous Robotics Systems, 14 pages.
Balle, J., et al., "Models for Static and Dynamic Texture Synthesis in Image and Video Compression"., IEEE Journal of Signal Processing, Nov. 2011, vol. 5, Issue 7 pp. 1353-1365.
Deussen, O., Hiller, S., Van Overveld, C., and Strothotte, T., "Floating points: A method for computing stipple drawings", Computer Graphics Forum 2000, vol. 19, No. 3, 10 pages.

(Continued)

*Primary Examiner* — Kee M Tung
*Assistant Examiner* — Frank Chen
(74) *Attorney, Agent, or Firm* — Patterson & Sheridan, LLP

(57) ABSTRACT

Techniques are disclosed for controlling robot pixels to display a visual representation of a real-world video texture. Mobile robots with controllable color may generate visual representations of the real-world video texture to create an effect like fire, sunlight on water, leaves fluttering in sunlight, a wheat field swaying in the wind, crowd flow in a busy city, and clouds in the sky. The robot pixels function as a display device for a given allocation of robot pixels. Techniques are also disclosed for distributed collision avoidance among multiple non-holonomic and holonomic robots to guarantee smooth and collision-free motions.

20 Claims, 10 Drawing Sheets

(56) References Cited

PUBLICATIONS

Doretto, G., Pundir, P., Prabhakar, Soatto, S., Ying, P. Wu, Y. N., Stefano, S., "Dynamic textures", In International Journal of Computer Vision, Jan. 1, 2002, pp. 1-38 (39 total counting cover page).

Ebeida, M. S., Davidson, A. A., Patney, A., Knupp, P. M., Mitchell, S. A., and Owens, J. D., "Efficient maximal poisson-disk sampling", ACM Trans. Graph. 30 Article 49 (Jul. 2011), 12 pages.

Jacobsson, M., Fernaeus, Y., and Holmquist, L. E., "Glowbots: Designing and implementing engaging human-robot interaction", Journal of Physical Agents vol. 2, No. 2, Jun. 2008, pp. 51-59.

Ju, E., Choi, M. G., Park, M., Lee, J., Lee, K. H., and Takahashi, S., "Morphable crowds", ACM Trans. Graph. vol. 29, No. 6, ARticle 140, Dec. 2010, pp. 140:1-140:9.

Lloyd, Stuart P., "Least squares quantization in PCM", IEEE Transaction on Information Theory, vol. IT-28, No. 2, Mar. 1982, pp. 129-137.

Papas, M., Jarosz, W., Jakob, W., Rusinkiewicz, S., Matusik, W., and Weyrich, T., "Goal-based caustics", Eurographics 2010, vol. 30 (2011) No. 2, 9 pages.

Reeves, William T., "Particle systems—a technique for modeling a class of fuzzy objects", ACM Transactions on Graphics, vol. 2, No. 2, Apr. 1983, pp. 91-108.

Saunders, P. C., Interrante, V., and Garrick, S. C., "Pointillist and Glyph-Based Visualization of Nanoparticles in Formation". In Data Visualization 2005: Proceedings of the Eurographics / IEEE VGTC Symposium on Visualization (Euro-Vis 2005, Jun. 1-3, 2005, Leeds, England, UK), Eurographics Association, Aire-la-Ville, Switzerland, K. W. Brodlie, D. J. Duke, and K. I. Joy, Eds., Eurographics Workshop Series, pp. 169-176.

Secord, A., "Weighted voronoi stippling". In in Proc. of NPAR 2002, ACM Press, 37-43.

Seo, S., and Yoon, K. "Color juxtaposition for pointillism based on an artistic color model and a statistical analysis". The Visual Computer, Apr. 17, 2010, pp. 421-431.

Sun, D., Roth, S., and Black, M. J. "Secrets of optical flow estimation and their principles". In the Twenty-Third IEEE Conference on Computer Vision and Pattern Recognition, CVPR 2010, San Francisco, CA, USA, Jun. 13-18, 2010, IEEE, pp. 2432-2439.

Szeliski, R. "Computer Vision : Algorithms and Applications", Texts in Computer Science, 2011 Chapter 5, pp. 235-271.

Toffoli, T., and Margolus, N. "Programmable matter: concepts and realization", Physica D 47 (Jan. 1991), pp. 263-272.

Tsao, Julia Y., "Curious Displays". The Art Center College of Design, Pasadena CA, 2009, 1 page http://people.artcenter.edu/~jtsao1/conclusion.html.

Volz, S., Bruhn, A., Valgaerts, L., and Zimmer, H. "Modeling temporal coherence for optical flow". In Proc. Thirteenth International Conference on Computer Vision, IEEE Computer Society Press, Barcelona 2011, pp. 1116-1123.

Wang, L., Xue, J., Zheng, N., and Hua, G., "Automatic salient object extraction with contextual cue". In Proc. Thirteenth International Conference on Computer Vision, IEEE Computer Society Press, Barcelona, 2011 pp. 105-112.

Zavlanos, et al., "Dynamic Assignment in Distributed Motion Planning with Local Coordination". Robotics, IEEE Transactions 24(1) pp. 232-242, Feb. 2008.

Zhong, et al., "Distibuted Coverage Control in Sensor Network Environments with Polygonal Obstacles". In IFAC World Congress, 2008.

Alami, et al., "Multi-Robot Cooperation Through Incremental Plan-Merging". N Robotics and Automation, 1995. Proceedings., 1995 IEEE International Conference on, vol. 3, pp. 2573-2579, vol. 3, May 1995.

Anderson, et al., "Constrained Animation of Flocks". In SCA'03: Proceedings of the 2003 ACM SIGGRAPH/Eurographics Symposium on Computer Animation, pp. 286-297, Aire-la-Ville, Switzerland, CH 2003. Eurographics Association.

Bahceci, et al., "A Review: Pattern Formation and Adaptation in Multi-Robot Systems". Technical Report, CMU, 2003.

Balkcom, et al. "Time Optimal Trajectories for Bounded Velocity Differencial Drive Vehicles". Int. J. Robot Res. (21)(3), pp. 199-218 (2002).

Bayazit, et al., "Swarming Behavior Using Probalistic Roadmap Techniques". Swarm Robotics, pp. 112-125, 2004.

Belta, et al., "Abstraction and Control for Groups of Robots". Robotics, IEEE Transactions 20(5) pp. 865-876, Oct. 2004.

Belta, et al., "Trajectory Design for Formations of Robots by Kinetic Energy Shaping". In ICRA, pp. 2593-2598, 2002.

Borenstein, et al. The Vector Field Histogram—Fast Obstacle Avoidance for Mobile Robots. IEEE Trans. Robot. Autom. (7), pp. 278-288 (1991).

Boyd, et al., "Swarmart: Interactive Art from Swarm Intelligence". In Proceedings of the 12th Annual ACM Conference on Multimedia, pp. 628-635, 2004.

Breitemoser, et al., "Voronoi Coverage of Non-Convex Environments with a Group of Networked Robots". In Proc. of the IEEE International Conference on Robotics and Automation (ICRA), May 2010.

Cao, Yi., "Munkres' Assignment Algorithm, Modified for Retangular Matrices". http://csclab.murraystate.edu/bob.ilgrim/445/munkres.html, Jun. 2008.

Chang, et al. Collision Avoidance for Multiple Agen Systems. Proc. IEEE Conf. Dec. Contr. pp. 539-542 (2003).

Clark, Christopher M., "Probalisitic Road Map Sampling Strategies for Multi-Robot Motion Planning". Robotics and Autonomous Systems, 53(3-4) pp. 244-264, 2005.

Cortes, et al., "Coverage Control for Mobile Sensing Networks". In Robotics and Automation, 2002. Proceedings. ICRA '02. IEEE International Conference vol. 2, pp. 1327-1332, 2002.

Dadova, et al., "Crowd Simulation". Technical Report, TU Wein, Austria, 2009.

Desai, et al., "A Graph Theoretic Approach for Modeling Mobile Robot Team Formations". Journal of Robot Systems, 19: pp. 511-525, 2002.

Elkaim, et al., "A Lightweight Formation Control Methodology for a Swarm of Non-Holonomic Vehicles". In Aerospace Conference, 2006 IEEE, 2006.

Farinelli, et al., "Multirobot Systems: A Classification Focused on Coordination". Systems, Man, and Cybernetics, Part B: Cybernetics, IEEE Transactions on 34(5): pp. 2015-2028, Oct. 2004.

Fiorini, et al., Motion Planning in Dynamic Environments Using Velocity Obstacles. Int. J. Robot. Res. (17)(7), pp. 760-772 (1998).

Gayle, et al., "Multi-Robot Coordination Using Genralized Social Potential Fields". ICRA, 2009.

Ghrist, et al., "Computing Pareto Optimal Coordinations on Roadmaps". International Journal of Robotics Research, 24(11) pp. 997-1010, Nov. 2005.

Guy, et al., "ClearPath: Highly Parallel Collision Avoidance for Multi-Agent Simulation". In: Proc. ACM SIGGRAPH Eurographics Symp. Comput. Animat. (2009).

Kwon, et al., "Group Motion Editing". ACM Trans. Graph., 27(3) pp. 1-8, 2008.

Lai, et al., "Group Motion Graphs". In SCA '05: Proceedings of the 2005 ACM SIGGRAPH/Eurographics Symposium on Computer Animation, pp. 281-29-, New York, NY USA, 2005.

Lal, et al., "Motion Planning Algorithms for a Group of Mobile Agents". Ph.D. Theseis, Texas A&M University, 2008.

Li, et al., "Motion Planning for a Crowd of Robots". In Robotic and Automation, 2003. Proceedings. ICRA '03 IEEE International Conference on, vol. 3, pp. 4215-4221 vo. 3, Sep. 2003.

Il, et al., "Motion Planning of Multiple Agents in Virtual Environments Using Coordination Graphs". In Robotics and Automation, 2005. ICRA 2005. Proceedings of the 2005 IEEE International Conference, pp. 378-383, Apr. 2005.

Michael, et al., "Controlling Shapes of Ensembles of Robots of Finite Size with Nonholonomic Constraints". In Proceedings of Robotics: Science and Systems IV, Zurich, Switzerland, Jun. 2008.

Mondada, et al. "The e-puck, a Robot Designed for Education in Engineering". In: Proceedings of the 9th Conference on Autonomous Robot Syststems Competetitions, vol. 1, pp. 59-65 (2009).

(56) References Cited

OTHER PUBLICATIONS

Munkres, J., "Algorithms for the Assignment and Transportation Problems". Journal of the Society for Industrial and Applied Mathmatics, 5: pp. 32-38, 1957.

Murray, Richard M., "Recent Research in Cooperative Control of Multivehicle Systems". Journal of Dynamic Systems Measurement and Control-Transactions of the Asme, 129: pp. 571-583, 2007.

Peng, et al., "Coordinating Multiple Robots with Kinodynamic Constraints Along Specified Paths". Int. J. Rob. Res., 24(4) pp. 295-310, 2005.

Pimenta, et al., "Sensing and Coverage for a Network of Hetergeneous Robots". In Decision and Control, 2008. CDC 2008. 47th IEEE Conference pp. 3947-3952, Dec. 2008.

Renzaglia, et al., "Distributed Coverage Control for a Multi-Robot Team in a Non-Convex Environment". In IEEE IROS09 3rd Workshop on Planning, Perception and Navigation for Intelligent Vehicles, St. Louis United States, 2009.

Reynolds, Craig W., "Flocks, Herds and Schools: A Distributed Behavioral Model". In SIGGRAPH '87: Proceedings of the 14th Annual Conference on Computer Graphics and Interactive Techniques, pp. 25-34, New York, NY USA, 1987, ACM.

Saha, et al., "Multi-Robot Motion Planning by Incremental Coordination". In Intelligent Robots and Systems, 2006 IEEE?RSJ International Conference on, pp. 5960-5963, Oct. 2006.

Schwager, et al., "Distributed Coverage Control with Sensory Feedback for Networked Robots". In Proceedings of Robotics Science and Systems, Philiadelphia, PA, Aug. 2006.

Sim'eon, et al., "Path Coordination for Multiple Mobile Robots: A Resolution Complete Algorithm". In: IEEE Trans. Robot. Autom 18(1) pp. 42-49, (2002).

Snape, et al., "Independent Navigation of Multiple Mobile Robots with Hybrid Reciprocal Velocity Obstacles". In: Proc. IEEE Int. Conf. Intell. Rob. Syst., (IROS) pp. 5917-5922 (2009).

Snape, et al., "Guaranteeing Smooth and Collision-Free Multi-Robot Navigation Under Differential-Drive Contraints". In: Proc. IEEE Int. Conf. Robot. Autom. (2010).

Stipanovi'c, et al., "Cooperative Avoidance Control for Multiagent Systems". In: ASME J. Dyn. Sys. Meas. Control, (129)(5), pp. 699-707, (2007).

Sung, et al., "Fast and Accurate Goal-Directed Motion Synthesis for Crowds". In SCA '05: Proceedings of the 2005 ACM SiGGRAPH/Eurographics Symposium on Computer Annimation, pp. 291-300, New York, NY USA 2005.

Takahashi, et al., "Spectral-Based Group Formation Control". In Computer Graphics Forum, 2009.

van den Berg, et al. "Reciprocal n-body Collision Avoidance". Proc. IEEE Inc. Conf. Robot. Autom., pp. 1-16 (2009).

van den Berg, et al. "Reciprocal Velocity Obstacles for Real-Time Multiagent Navigation". Proc. IEEE Inc. Conf. Robot. Autom., pp. 1928-1935 (2008).

van den Berg, et al., "Prioritized Motion Planning for Multiple Robots". In Intelligent Robots and Systems, 2005. (IROS 2005). 2005 (IEEE/RSJ International Conference on, pp. 430-435, Aug. 2005.

van den Berg, et al., "Centralized Path Planning for Multiple Robots: Optimal Decoupling into Sequential Plans". In Proceedings of Robotics: Science and Systems, Seattle, USA, Jun. 2009.

van den Berg, et al., "Interactive Navigation of Multiple Agents in Crowded Environments". In I3D' 08: Proceedings of the 2008 Symposium on Interactive 3D Graphics and Games, pp. 130-147, New York, NY, USA, 2008. ACM.

Wilkie, et al., "Generalized Velocity Obstacles". In: Proc. IEEE Int. Conf. Intell. Rob. Syst., pp. 5573-5578 (2009).

* cited by examiner

ROBOTIC TEXTURE

CROSS-REFERENCE TO RELATED APPLICATIONS

This application is a continuation in part of United States patent application titled, "A DISPLAY WITH ROBOTIC PIXELS," filed on Jun. 8, 2011 and having Ser. No. 13/156,212 now U.S. Pat. No. 8,723,872 and claiming priority benefit to U.S. provisional patent application titled, "RECIPROCAL COLLISION AVOIDANCE FOR MULTIPLE NON-HOLONOMIC ROBOTS," filed on Jul. 9, 2010 and having Ser. No. 61/363,154 and U.S. provisional patent application titled, "CHOREOGRAPHIC MULTI-AGENT PATTERN FORMATION," filed on Jun. 9, 2010 and having Ser. No. 61/353,179. These related applications are also hereby incorporated by reference in their entirety.

BACKGROUND

1. Field of the Invention

The present invention relates to the fields of robotics and visual displays and, in particular, to systems and methods for reciprocal collision avoidance for multiple non-holonomic robots and choreographic multi-agent pattern formation.

2. Description of the Related Art

Some existing examples of display technologies are screens and projectors, but the pixels are fixed on a rectilinear grid and the physical arrangement of the pixels does not contribute to the visual representation. Other existing examples of display technologies have mobile pixels, but they do not have a method to display an arbitrary input on a given allocation of mobile pixels. In some cases, it may be desirable to have a new type of display, with mobile pixels that deploy in a physical arrangement that contributes to the visual representation as well as an approach to displaying an arbitrary input using a given allocation of mobile pixels.

Furthermore, existing methods for controlling a set of mobile robots do not address the problem of how to direct a set of mobile robot pixels to create a representational image. For example, an artist might create a cartoon animation of an animal or character with shapes for the head and torso and limbs, and the robot pixels are required to adopt the shapes, and to change position as the character moves. In some cases, it may be desirable to have an approach to controlling mobile robots in order to represent a fixed or changing arbitrary set of shapes.

Furthermore, existing methods for path planning for multiple non-holonomic robots in a common workspace are either not real-time or are approximations. In some cases, it may be desirable to have a technique for performing path planning for multiple non-holonomic robots that is real-time and more accurate than existing approaches.

SUMMARY

One embodiment of the present invention sets forth a method for generating, by mobile entities, a dynamic texture for display. The method comprises the steps of receiving an input dynamic texture and receiving actual positions of the mobile entities. Texture characterization parameters are computed for a time step based on the input dynamic texture. Goal positions for the mobile entities to generate a visual representation of the input dynamic texture are computed, where the goal positions are based on the texture characterization parameters and the actual positions of the mobile entities. Each one of the goal positions is provided to a physical controller of the mobile entities.

One embodiment of the present invention sets for a system for generating, by mobile entities, a dynamic texture for display. The system includes a memory that is configured to store instructions for a program and a processor that is configured to execute the instructions for the program to generate the dynamic texture by performing an operation. The operation comprises receiving an input dynamic texture and receiving actual positions of the mobile entities. Texture characterization parameters are computed for a time step based on the input dynamic texture. Goal positions for the mobile entities to generate a visual representation of the input dynamic texture are computed, where the goal positions are based on the texture characterization parameters and the actual positions of the mobile entities. Each one of the goal positions is provided to a physical controller of the mobile entities.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF EXEMPLARY EMBODIMENTS

Figure 1:
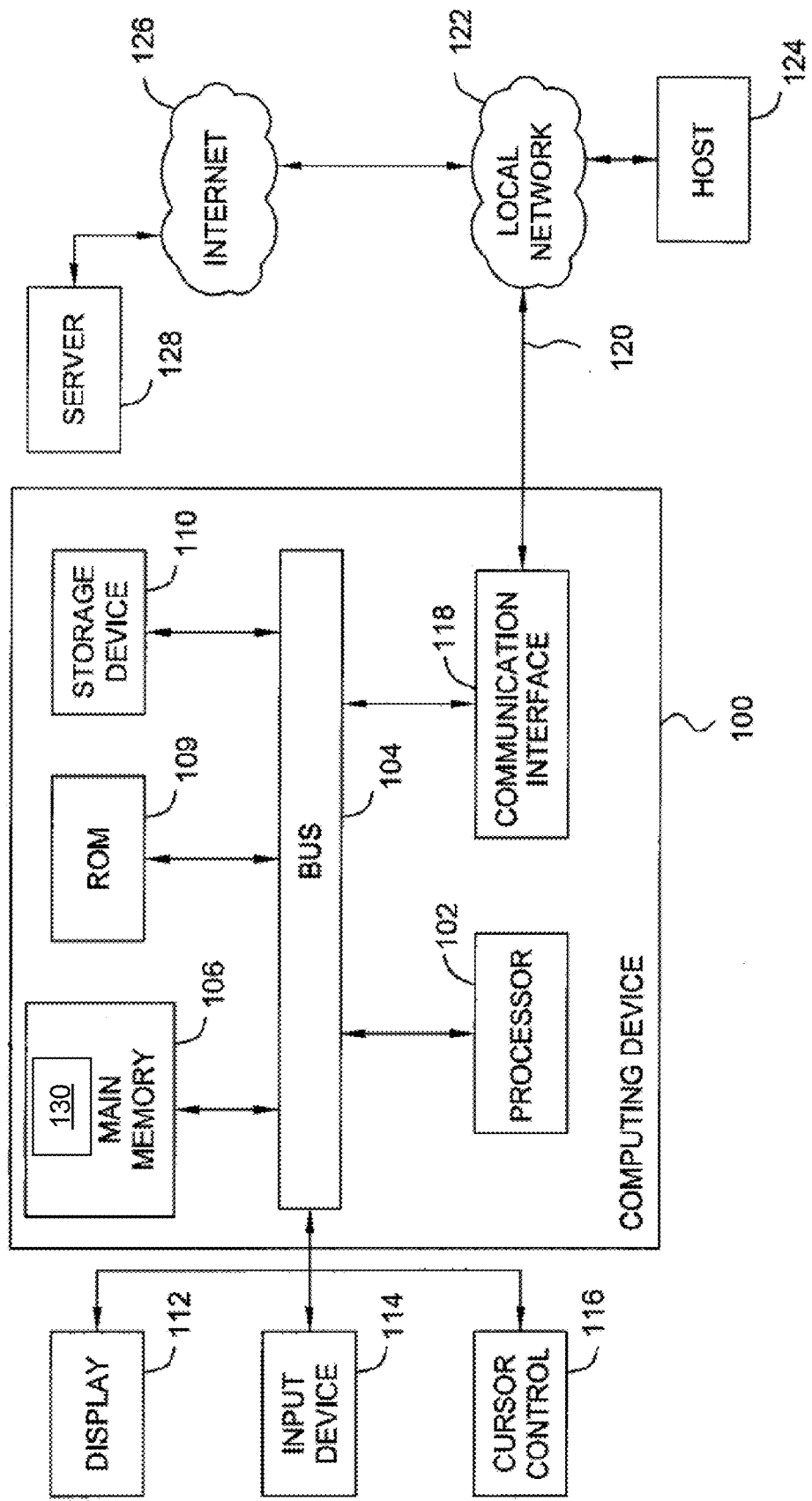
FIG. 1 is a block diagram of a system, according to one embodiment of the invention.

Embodiments of the invention include a system for reciprocal collision avoidance for multiple non-holonomic robots and choreographic multi-agent pattern formation. One embodiment of the present invention sets forth a method for controlling multiple non-holonomic robotic elements. The method comprises the steps of increasing a radius associated with each non-holonomic robotic element by a respective maximum tracking error value with respect to a trajectory of a holonomic robotic element to generate a set of modified radii and generating a set of collision-free velocities based on the set of modified radii, a first set of allowed holonomic velocities for each robotic element of multiple holonomic robotic elements, and a second set of collision-free velocities for each robotic element of the multiple holonomic robotic elements relative to neighboring robotic elements of the multiple holonomic robotic elements, where each robotic element of the multiple holonomic robotic elements is associated with a respective robotic element of the multiple non-holonomic robotic elements. An optimal holonomic velocity is selected for each robotic element of the multiple holonomic robotic elements from the set of collision-free velocities. The optimal holonomic velocity for each robotic element of the multiple holonomic robotic elements is mapped to each respective robotic element of the multiple non-holonomic robotic elements to generate inputs for controlling collision-free movement of the multiple non-holonomic robotic elements.

Embodiments of the invention implement a set of robot pixels to display a visual representation of an input. As an example, the input to the system could be an image of a face, and the robot pixels would deploy in a physical arrangement that is appropriate to say a long face or a round face and would change their physical arrangement over time to represent a changing facial expression. Embodiments of the invention also include the different control algorithms and techniques used to control the locations and motions of the robot pixels to realize the visual representations of different inputs. One embodiment of the present invention sets forth a method for generating, by mobile entities, a visual representation for display. The method comprises the steps of receiving an input image, determining an available number of the mobile entities, computing a distribution of goal positions for the mobile entities to generate a visual representation of the input image, where the distribution of the goal positions is based on the available number of mobile entities, and assigning each one of the mobile entities to a respective one of the goal positions.

Embodiments of the present invention may provide a number of advantages including, for example, deploying a set of robot pixels in various ways based on different inputs to produce different types of visual representations of those inputs; allowing the visual representations to change over time; and enabling path planning for non-holonomic robots in real-time.

Mobile robots deployed in research or industry are often non-holonomic. In the field of robots, holonomicity refers to the relationship between the controllable and total degrees of freedom of a given robot. If the number of controllable degrees of freedom equals the total degrees of freedom for a particular robot, then the robot is said to be holonomic. If the number of controllable degrees of freedom is less than the total degrees of freedom for the particular robot, then the robot is said to be non-holonomic. An automobile is an example of a non-holonomic vehicle. The vehicle has three degrees of freedom—its position in two axes, and its orientation relative to a fixed heading. Yet an automobile has only two controllable degrees of freedom with which to control the position and orientation of the automobile—acceleration/braking and the angle of the steering wheel. The direction in which an automobile is traveling (the heading of the automobile) must remain aligned with the orientation of the automobile (or 180° from it when the automobile is traveling in reverse). The automobile has no other allowable direction, assuming there is no skidding or sliding. Thus, not every path in phase space is achievable; however, every path can be approximated by a holonomic path.

Therefore, installations with multiple robots in real world scenarios, such as multiple vacuum cleaners or collaborative monitoring and maintenance vehicles, require collision avoidance methods that take the non-holonomic constraints of the robots into account. Embodiments of the present invention extend Optimal Reciprocal Collision Avoidance (ORCA) toward non-holonomic reciprocal collision avoidance. ORCA is described by Jur van den Berg, Stephen J. Guy, Ming Lin, and Dinesh Manocha in "Reciprocal n-body Collision Avoidance," published in the International Symposium on Robotics Research, (2009) (referred to as van den Berg et al.), incorporated by reference herein in its entirety. The robots are controlled to stay within a maximum tracking error $\epsilon$ of an ideal holonomic trajectory. Control inputs for optimal tracking are derived from mapping holonomic onto non-holonomic velocities.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As one skilled in the art will appreciate, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be used. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Hardware Overview

FIG. 1 is a conceptual diagram of a computing device 100 that may be configured to implement one or more aspects of embodiments of the present invention. Computing device 100 may be any type of computing device such as, for example, a desktop computer, a laptop computer, a server machine, a set-top box, a game system or console, a personal digital assistant or a cellular phone. As shown, computing device 100 includes, without limitation, a bus 104 for communicating information and a processor 102 coupled to bus 104 for processing information.

Computing device 100 also includes a main memory 106, such as a random access memory or other dynamic storage device, for storing information and instructions to be executed by processor 102. For example, main memory 106 may include instructions 130 that, when executed by processor 102, cause processor 102 to implement any of the algorithms or techniques described herein for controlling the locations and movements of one or more robot pixels to create different visual representations based on various inputs. Processor 102 may be a central processing unit (CPU), a graphics processor, any other type of special-purpose processor or a hardware state machine with special-purpose logic dedicated to implementing only the functionality of the disclosed method. Also, as persons skilled in the art would readily recognize, memory units other than main memory 106 may be used to store all or part of the relevant instructions necessary for implementing the algorithms and techniques described herein.

Computing device 100 may be coupled via bus 104 to a display 112 for displaying information to a user. An input device 114, including alphanumeric and other keys, is coupled to bus 104 for communicating commands and other information to processor 102. Another type of user input device is a cursor control 116, such as a mouse, joystick, trackball or direction keys, or the like, for communicating command selections and direction information to processor 102 and for controlling cursor position and movement on display 112. Computing device 100 also may include a communication interface 118 coupled to bus 104 that provides access to a local network 122 via a network link 120. Local network 122 may, in turn, couple computing device 100 to a host computer 124 or other device on local network 122, or may couple computing device 100 to more remote devices, such as a server 128, through a wide area network, such as Internet 126.

Choreographic Multi-Agent Pattern Formation

One embodiment of a system configured to organize multiple agents to form an image is a DisplaySwarm, which is a multi-robot display. A DisplaySwarm system consists of a computing device, an overhead camera, and a set of robot pixels. The system shown in FIG. 1 may be configured to implement the DisplaySwarm where the overhead camera is an input device 114. The computing device 100 receives images of the swami, e.g., set of robots, from the overhead camera and wirelessly transmits motion commands to the robots. The robots are differentially-driven and have red, green, blue (RGB) light-emitting diodes (LEDs) to provide controllable pixel color and infra-red LEDs to facilitate localization and tracking.

The swarm may be deployed in a horizontal workspace. The objective of the system is to obtain optimal placements of the robot pixels to represent an image, and to have visually appealing and fast-converging motion of the robots. The system has the following modes (i) image display—display a single image, (ii) video display—display a sequence of images to make an animation, (iii) similarity transformation display—display an image undergoing translation, rotation, and scaling, and (iv) scenario with dynamic obstacles—a hybrid system of controlled robots plus uncontrolled robots that do not react to the presence of others. In one embodiment, a robot may be added, removed, or repositioned manually as the robots are controlled to form an image. In one embodiment, one or more robots may be added, removed, or repositioned by a user-controlled input device.

The DisplaySwarm system may be configured to control robot pixels to display a visual representation of an input. As an example, the input to the system could be an image of a face, and the robot pixels would deploy in a physical arrangement that is appropriate to say a long face or a round face, and would change their physical arrangement over time to represent changing facial expression. Unlike conventional display technologies, such as screens and projectors, where the pixels are fixed on a rectilinear grid and the physical arrangement of the pixels does not contribute to the visual representation, the robot pixels do not have a fixed physical arrangement. Additionally, the robot pixels may be controlled to display an arbitrary input on a given allocation of mobile pixels.

Figure 2A:
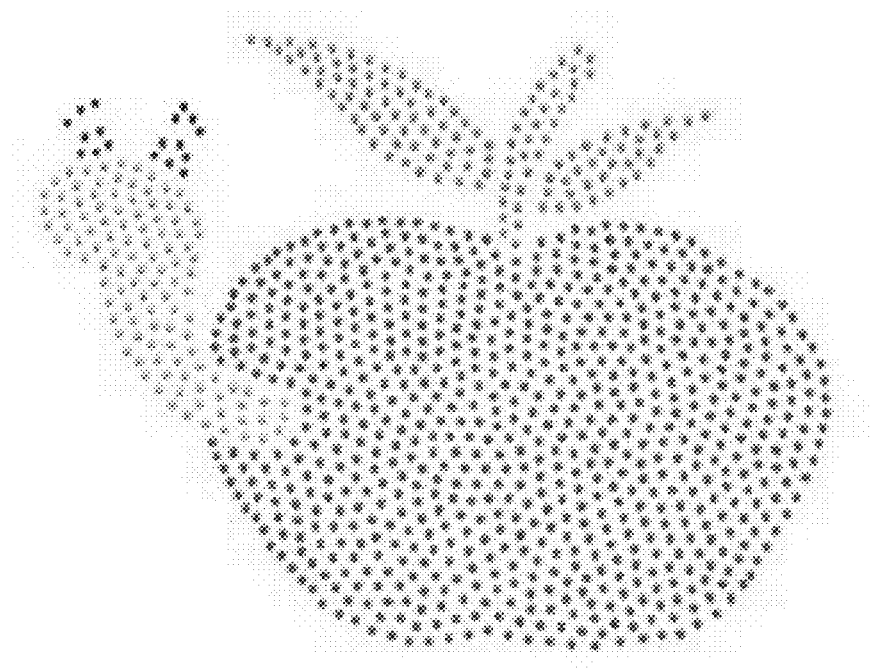
FIG. 2A illustrates 1000 robots configured to display an image of an apple and a worm, according to one embodiment of the invention.

FIG. 2A illustrates 1000 robots configured to display an image of an apple and a worm, according to one embodiment of the invention. The robots forming the apple may be configured to light red LEDs, the robots forming the worm may be configured to light yellow LEDs, the robots forming the leaves may be configured to light green LEDs, and the robots forming the stem may be configured to light brown LEDs.

A DisplaySwarm system is suitable for indoor or outdoor settings, including non-horizontal surfaces that support magnetic adhesion. The DisplaySwarm system has the potential to automatically adapt to a physical environment to 'break' the rectangular frame of most of the traditional displays. The DisplaySwarm enables new types of aesthetic effects that are out of reach of traditional displays. For example the motion characteristics of the robots as they transition through an animated sequence are an integral part of the aesthetic effect. Existing techniques for controlling a set of mobile robots do not address the problem of how to direct a set of mobile robot pixels to represent a fixed or changing arbitrary set of shapes. For example, an artist might create a cartoon animation of an animal or character with shapes for the head and torso and limbs, and the robot pixels are required to adopt the shapes, and to change position as the character moves.

In addition to controlling robots to form static images, the DisplaySwarm system may also control the robots to form a sequence of images. Finally, there is a sense of uniqueness to a performance by physical robots that is not found with an image shown on traditional displays, where the goals are absolute veracity and reproducibility. Therefore, an individual experience may be created for the viewer, and the personal dimension can even be emphasized by adding interaction between the spectator and the robot swarm.

In one embodiment, the DisplaySwarm system employs an explicit process of taking an input image or input animation and determining a physical configuration plus robot colors at one or more time instances. The input animation may be created from single input image using a function which is repeatedly applied to the image to produce a dynamic effect. The DisplaySwarm system generates goal positions for the robots, goal assignment, path planning and local collision avoidance. The DisplaySwarm system, includes a processing pipeline to compute goal positions for each robot being controlled while monitoring obstacles. The control is decentralized and the DisplaySwarm system is scalable (in terms of robot quantity) and provides visual appeal in terms of smooth and oscillation-free trajectories plus final robot configurations that are accurate representations of the desired content.

Although, the DisplaySwarm is described as controlling robots, the DisplaySwarm may also be used to control other types of moveable objects.

In one embodiment, a camera connected to computing device 100 observes a set C of robot pixels on a ground-plane D in state E. The computing device 100 analyzes images from the camera to determine state E, including identity, location, and orientation of each robot pixel. To determine identity for example, the computing device 100 determines the identity of a robot pixel F by detecting an identity code emitted by F using a set G of LEDs mounted on F. To determine location for example, the camera may be a stereo system, and the computing device 100 determines the location of F using stereo imaging techniques. To determine orientation for example, the set G of LEDs might be aligned with the front-rear direction of the robot.

A second camera may also be connected to the computing device 100. The second camera captures an image I. For example, I is an image of a user's face. The computing device 100 uses a process to analyze image I to determine a binary-image K of the robot pixels that visually represents the face. The binary-image K is a set of one or more 2D shapes L=L1, L2,L3 .... For example, the shapes L might correspond to the eyes, nose, mouth, shadows or silhouette boundary of a face. There are various criteria to compute K, for example using high gradients in the image, or using visual saliency, or using background-subtraction to detect pixels on an object's silhouette.

The computing device 100 uses another process to determine a physical arrangement N of the robot pixels that represents the binary-image K, subject to the constraint that the total number of robot pixels equals a number <x>. The process first determines the number of robot pixels to allocate to the shapes L. For example, the ratio of the pixel counts for shapes L could equal the ratio of the sizes of the shapes L.

Subject to the allocated number of pixels per shape, a set of goal points G is computed within the shapes L. The method of determining the ideal goal positions for the robot pixels within the shapes is based on Voronoi Coverage (a coverage method based on Centroidal Voronoi Tessellation described by J. Cortes and S. Marinez in "Distributed Control of Robotic Networks," published in the Princeton University Press, (2009) (referred to as Bullo et al.), incorporated by reference herein in its entirety.) but modified to handle multiple shapes. The robot pixels C are moved toward the goal points G in an iterative process. At each iteration, an assignment is made between the robot pixels C and the goal points G. The method for determining a collision-free motion which is close to the ideal motion is based on a Reciprocal Velocity Obstacles technique modified to work on a non-holonomic robot such that there is a guarantee that the physical robot motion will be within a specified error distance of the ideal robot motion. The computing device 100 transmits the computed motion to the robot pixels C, and the robot pixels move correspondingly. At the end of the iteration, computer B recomputes the state E of the robot pixels C. The iteration terminates when the robot pixels are sufficiently close to the goal points G. The method of generating goal positions, assigning the goal positions to specific robots, and performing collision avoidance during robot movement is described in further detail in conjunction with FIGS. 3, 4, 5A, 5B, and 6.

Figure 2B:
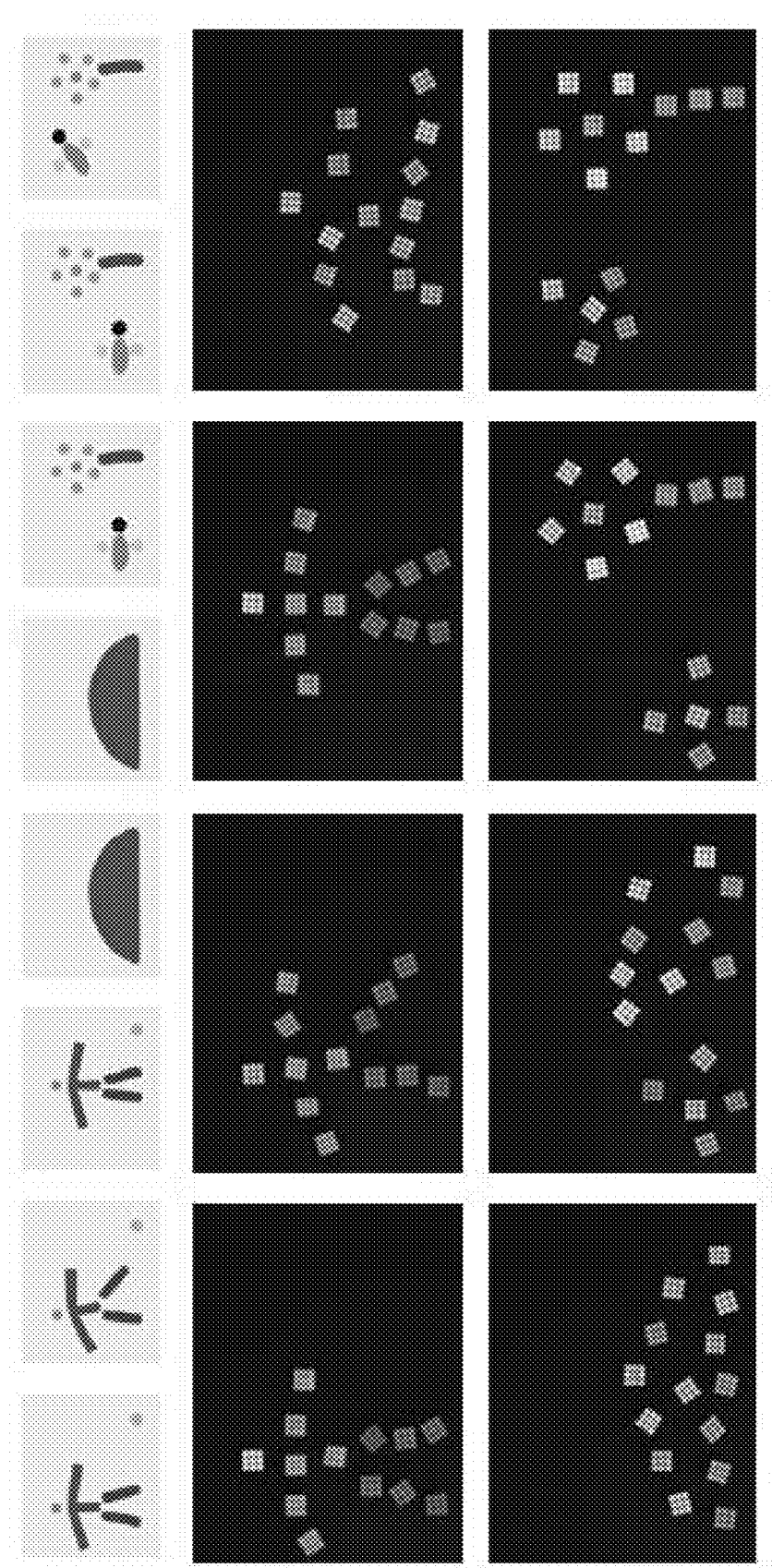
FIG. 2B illustrates a sequence of frames of robots forming images, according to one embodiment of the invention.

FIG. 2B illustrates a sequence of frames of robots forming images, according to one embodiment of the invention. A sequence of images of a moving human (3 frames), a rock (2 frames), and a flower circled by a bee (3 frames) are depicted across the top of FIG. 2B. Robots are configured to form the sequence of images using the DisplaySwarm system. Specifically, the transitions between the human and the rock and between the rock and the flower circled by a bee are controlled by goal positions assigned to the different robots. Notably, even a small number of robots suffices to form meaningful animated shapes. The smaller the number of robots, the more abstract the representation becomes.

Applications of the DisplaySwarm include deploying robot pixels on a horizontal surface such as on the ground or on a tabletop or on a vertical surface such as a wall. For example, the robots could use electro-adhesion, glue, vacuum, gecko feet, or micro-spine toes to move on an arbitrary wall, or use magnetism to move on a ferromagnetic surface, including the case where a ferromagnetic film is overlaid on an existing wall, and including the case where the ferromagnetic surface is concealed behind a conventional wall surface. The robot pixels could be robot boats deployed on a water surface, or flying robots deployed in the air. The robot pixels could be deployed on a vertical surface, and confined within a rectangular frame that looks like a traditional picture frame. The robots would create a 'robot picture' within the picture frame.

In another embodiment, individual robot pixels could have specific shapes like eyes and noses and mouths, and the DisplaySwarm system would determine the best choice of robot pixels to represent an input image of a particular face. A projector could project onto the same surface on which the robots are deployed, to enhance the visual effect. For example, the robot pixels could adopt a physical arrangement to represent a face, and the projector would project the face image in correct registration with the robot pixels to provide background texture. The projection could be automatically masked so that it illuminates the background only and not the robots themselves. In another example, the projector could provide visual effects such as visual trails behind the robots when they are moving.

The robot pixels could be deployed to look like an arcade game. The game could be a hybrid mix of robots and projection, and fast-moving parts of the game like missiles could be handled using projection. Additionally, the robot pixels could be identical or heterogeneous with various form-factors. The robot pixels could change appearance in various ways. For example, a robot could have colored light sources, or a moving physical component such as a mirror that could be flipped, or a colored cube that could be rotated, to make visual effect. A robot could have a specific shape for representing specific inputs. For example, there could be robot pixels in the shape of facial features like eyes, noses, and mouths.

The input could be an image, say of a face, and the robot pixels would create a visual representation of the face. For example, the image could be automatically converted to a binary image, and the robot pixels would represent the on- or off-binary segments. Alternatively the image could be represented in a stylistic way. For example, the DisplaySwarm system could analyze the face image to determine facial expression, and the arrangement of the robot pixels would be a stylized representation of the expression—if the user were smiling, the robot pixels would deploy into the shape of a smile. Furthermore, the DisplaySwarm system can configure the robot pixels to dynamically adapt to changes in the face. For example, if the user stopped smiling and made a wide-open mouth, then the robot pixels would change from a smiling mouth to a wide-open mouth.

An artist animation could be input to the DisplaySwarm system, and the DisplaySwarm system would represent the artwork. For example, an artist could draw a humanoid figure and the robot pixels would represent the humanoid. And the artist could animate the humanoid figure so that it was walking, and the robot pixels would move to represent the walking motion. The input could be an image of a user who is wearing a logo, for example on a t-shirt or bag or cap, and the DisplaySwarm system would detect and recognize the logo, and the DisplaySwarm system would represent that logo. For example, the DisplaySwarm system could recognize that a user is wearing a character or team logo, and the robot pixels would display a representation of the character or team, respectively. The input could be a visual or audio signal that there is a special event, and the DisplaySwarm system would recognize and visually represent the event. For example, the input could be audio of someone saying 'happy birthday' and the robot pixels would display a birthday cake. Or the input could be an image of a user waving a Stars and Stripes flag, and the robot pixels would display a Stars and Stripes flag, with the motion of the robots representing the fluttering of the flag.

Figure 3A:
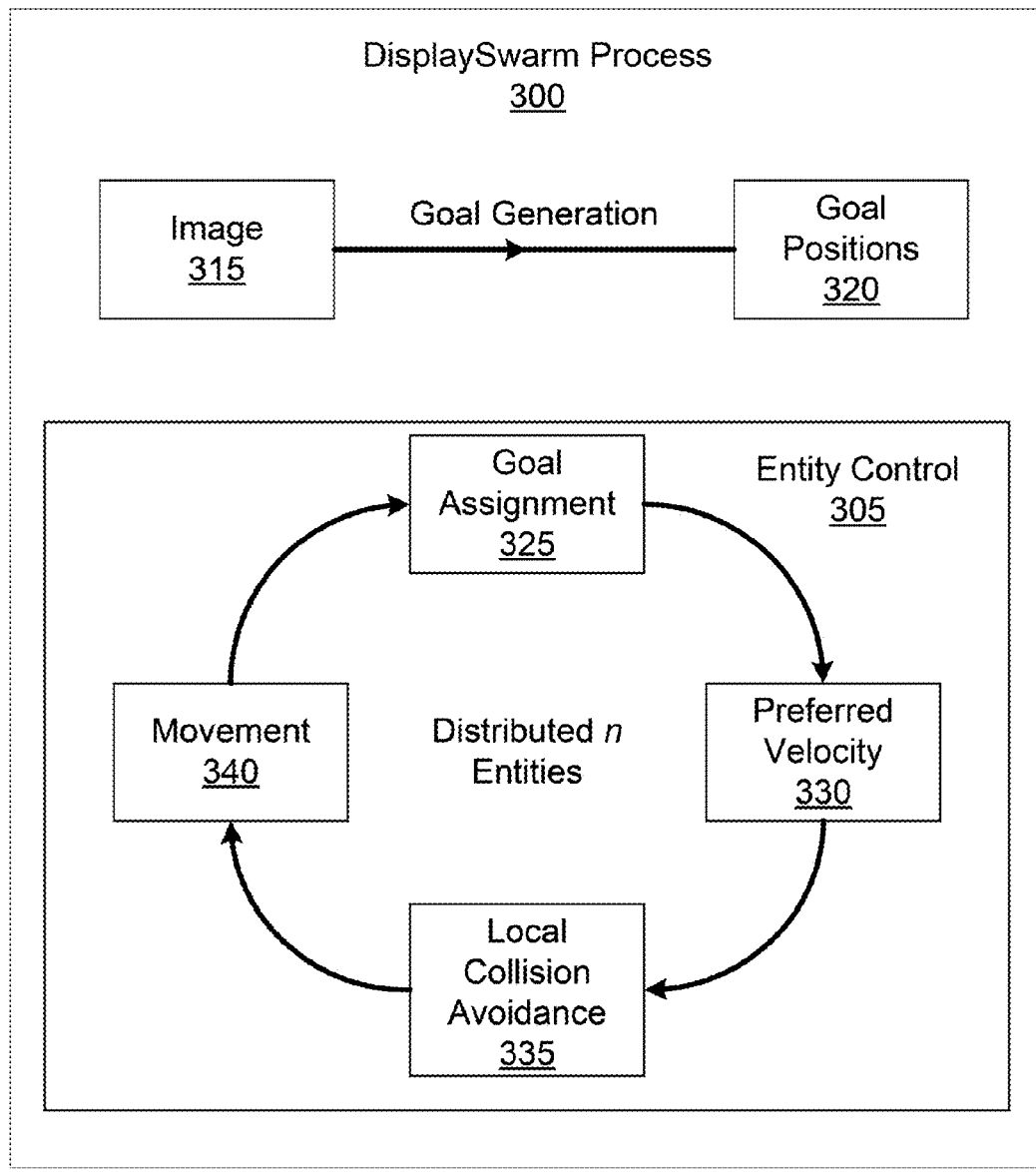
FIG. 3A illustrates a process performed to control the movement of robots to form images, according to one embodiment of the invention.

FIG. 3 illustrates a process 300 performed by the DisplaySwarm system to control the movement of robots to form images, according to one embodiment of the invention. Goal generation 310 and entity control 305 are independent components of the DisplaySwarm process 300. Goal generation 310 is the computation of the robot pixel positions to represent a desired image 315, given an available or specified number of robots or entities, n. A real-time controller drives the robot pixels (or entities) to the computed goal positions 320. The controller is iterative and is subdivided into three parts.

Firstly, robots are assigned to the goal positions 320 in a unique and optimal way by an auction algorithm during the goal assignment 325. Secondly, each robot independently computes a preferred velocity towards its assigned goal position. Finally, a reciprocal collision avoidance algorithm (described in further detail in conjunction with FIGS. 4, 5A, 5B, and 6) finds a collision-free velocity for the non-holonomic robots with respect to the current positions and velocities of their neighbors. The new velocities that are determined in the local collision avoidance 335 process are close to the robots' preferred velocities 330, and enable a safe motion update of the robotic display. Latombe showed that it is intractable to compute the optimal motions of n robots interacting in a common workspace because the search space is exponential in n. The reasons for intractability are described by J. C. Latombe in "Robot Motion Planning," published by Kluver (Boston), (1991) (referred to as Lantombe), incorporated by reference herein in its entirety. Thus a distributed scheme, such as the technique employed by the DisplaySwarm system, where each robot independently determines a collision-free velocity towards their respective goal position is advantageous. Finally, each robot moves according to the collision-free velocity to complete movement 340 before returning to the goal assignment 325.

Goal generation 310, goal assignment 325 and local collision avoidance 335 all allow for distributed computation, and this guarantees scalability of the DisplaySwarm system. Common information for the goal generation 310 is limited to the current position of all the neighboring generator points and the image 315 to be displayed. Common information for the local collision avoidance 335 is limited to the size, position and velocity of a robot's neighbors. Although the algorithms could be fully decentralized among the robots, and common information be inferred independently by each robot or by using broadcast between robots, the DisplaySwarm includes the computing device 100 for reduced complexity. In one embodiment, computing device 100 supports parallelization by multi-threading on multiple cores. Goal generation 310 and local collision avoidance 335 both allow parallel computation where variables are independent and no interaction between threads is needed. Goal assignment 325 using the auction algorithm may decentralized.

In one embodiment, the goal positions 320 and colors for the robots to optimally represent the image 315 are determined based on Voronoi diagrams and methods from locational optimization for the goal generation 310. The technique used to determine optimal goal positions based on Voronoi diagrams is described by A Okabe and A. Suzuki in "Locational optimization problems solved through Voronoi Diagrams," published in the European Journal of Operational Research, 98(3) pages 445-456 (May 1997) (referred to as Okabe et al.), incorporated by reference herein in its entirety. Centroidal Voronoi tessellations (CVT) have been rediscovered for robotics by Cortes et al. by deriving decentralized control laws for robotic environment coverage. The CVT is applied in an adapted form for iterative optimization of the robots' goal positions 320. The adapted form of the algorithm, referred to as the multi-Voronoi coverage algorithm (described in the following section titled Iterative Optimization by Multi-Voronoi coverage), results in balanced final goal distributions and uniform coverage of the regions of the image generated for display.

As previously described in conjunction with FIG. 2B, the DisplaySwarm system may also be used to control entities forming a sequence of images in environments where dynamic obstacles exist, e.g., uncontrolled entities. First, for each image 315 or frame $I_f$,$f\in[1,N_F] \subset \mathbb{N}$, a set of goal positions $\mathcal{G}_f$ is obtained, where $N_F$ is the number of frames. Each goal set is computed following the multi-Voronoi coverage algorithm. The goal positions 320 computed for the previous frame $\mathcal{G}_{f-1}$ can serve as start positions for the computation of the goal positions 320 of the current frame to reduce computation time and disparities between consecutive goal sets.

After the goal sets $\mathcal{G}_f$,$f\in[1,N_F] \subset \mathbb{N}$, have been computed, an iterative procedure drives the robots through the given goal positions 320, representing the given frames in sequence. In order to achieve a smooth movement of the robots, the update rate of the controller should be higher than that of the frames. Therefore, the set of goal positions 320 remains constant for a fixed number of time steps and then changes to the one given by the next frame of the video sequence.

Note that with this method, intermediate, irrelevant frames can be omitted. The robots move to represent the next given frame and the movement in-between is not specified. This is an advantage for the creator of the video who only needs to specify a set of keyframes. The quality and dynamics of the video are affected by increased disparity between frames. Closer frames will lead to smoother motions. Frames with high disparities might lead to deformations of the shapes.

Finally, consider the case where dynamic obstacles are present in the scenario, such as robots whose motion is not controlled. Therefore, the dynamic obstacles do not react to the presence of other robots at all. Avoiding collisions with dynamic obstacles is handled in local collision avoidance 335 and solved by inferring the velocity of the dynamic obstacles. Robots take full responsibility in avoiding the collision by selecting c=1 in Equation (23).

The input image 315 is given as the color map $\mathcal{I}:\mathcal{Q}\to[0,255]^3 \subset \mathbb{N}^3$ which assigns a color $\mathcal{I}(q)$ to each position of a normalized square $\mathcal{Q}$ with $q\in\mathcal{Q}=[0,1]\times[0,1]\subset\mathbb{R}^2$. The original image space $\mathcal{Q}$ is first divided into regions of interest, where the goal positions are to be distributed. The segmentation is computed on a case by case basis by manually selecting the regions to represent. In one embodiment, the regions to represent are selected automatically. A reasonable segmentation can alternatively be obtained from identifying connected regions similar in color. The segmentation of an image into an optimal number of entities, which allow for an accurate image representation, is a fundamental but still unsolved problem in computer vision.

The resulting M regions $R_i \subset \mathcal{Q}$ are themselves connected subsets of the image space, each satisfying $R_i \cap R_j = \emptyset$, $\forall i \neq j \in I_R=[1,M] \subset \mathbb{N}$. The region $\mathcal{Q}\setminus\cup_{i\in I_R} R_i$ is considered as empty space, where no goal positions exist. After the connected regions $R_i$ are extracted, convex sets $C_i$ are computed, for which $R_i \subseteq C_i, \forall i\in I_R$. Each convex set $C_i$ is defined by the convex hull of $R_i$. For simplicity, $C_i$ is here constructed as the smallest rectangle that completely contains $R_i$. The convex regions are needed as a prerequisite for the computation of the Voronoi tessellation in the multi-Voronoi coverage algorithm described below.

Given the total number of robots N, $N_i$ goal positions 320 are to be found for each region $R_i$, satisfying $N=\Sigma_{i\in I_R} N_i$. In one embodiment, the DisplaySwarm may be configured to make the assignment proportional to the area of each region $A_i$. $N_i \propto A_i$ to enable a balanced density of goal positions 320 over all regions of interest. However, other distributions of the number of goal positions 320 per region are also possible. For example, the distribution of the goal positions 320 can be defined by a user.

In order to generate a homogeneous distribution of goal positions 320, a mass density function $\rho_i$ is computed for each set $C_i$. The mass density function is used in the multi-Voronoi coverage algorithm to prioritize the regions $R_i$ within $C_i$. $\rho_i$ assumes high values within the subsets $R_i$ and low values in its surroundings. For each region $R_i$ the mass density function $\rho_i:C_i \to \mathfrak{R}+$ satisfies for all p, $q\in C_i$ $$\rho_i(q) \geq \rho_i(p) \Leftrightarrow d(q,R_i) \leq d(p,R_i), \qquad (1)$$

where $d(q, R_i)$ represents the Euclidean distance from $q\in C_i$. The mass density presents a maximum in the region $R_i$ and decreases with the distance from it.

The set $\mathcal{Q}$ is divided into a grid $A=\cup_{r,s} A_{r,s}$ equivalent to the pixels of the original image, and the mass density functions are defined as $\rho_i:A\cap C_i \to \mathfrak{R}+$, where, with an abuse of notation, $q\in A_{r,s}$ and $$\rho_i(q) = K_m, \text{ if } A_{r,s} \cap R_i \neq \emptyset \qquad (2)$$
$$\rho_i(q) = K_d \max_{\hat{q}\in A_{r\pm\{0,1\},s\pm\{0,1\}}} \rho_i(\hat{q}), \text{ otherwise.}$$

$\rho_i(\hat{q})$ is the value of the mass density function in a neighboring grid cell of $A_{r,s}$, assuming 8-connectivity of the grid. Uniform distributions of goal positions inside the regions of interest are favored by mass density functions of extremely steep gradient, where $\rho_i(q)\to\infty, \forall q\in R_i$ and $\rho_i(q)\to 0, \forall q\in C_{i\setminus R_i}$. Accordingly, the values for our choice of $\rho_i(q)$ are selected to $K_m=10^{15}$ and $K_d=0.1$ for a grid partition $r,s\in[1,700]^2 \subset \mathbb{N}^2$.

The iterative optimization of the goal positions 320 by the multi-Voronoi coverage algorithm converges to configurations of local optima only. However, if a final configuration close to the global optimum can be reached, the goal positions 320 are equally distributed. This requires an initialization method that samples $N_i$ starting goal positions from the regions $R_i$ to produce a set of N sufficiently spread seeds. The time needed for convergence is greatly affected by the initial positions.

Common sampling methods are Monte-Carlo or rejection sampling techniques. The DisplaySwarm system may be configured to sample in the following from a uniform distribution inside each $R_i$ while accepting position values q, p if $\|q-p\| \geq K_s, \forall p,q \in R_i$, where $K_s$ is a constant, in this work set to $$1.2\sqrt{\frac{A_i}{\pi N_i}}$$

where $A_i$ is the area of region $$R_i, \sqrt{\frac{A_i}{\pi N_i}}$$

the radius of a circle of area $$\frac{A_i}{N_i}$$

and the factor 1.2 is chosen in order to obtain a good distribution with lower computational cost. A method similar to generating a Poisson disk distribution inside the regions $R_i$ may be used to obtain a good distribution. A technique for generating a Poisson disk distribution is described by A. Lagae and P. Dutre in "A Comparison of Methods for Generating Poisson Disk Distributions," published in Report SW 459, Departement Computerwetenschappen, Katholieke Universiteit Leuven, Celestijnenlaan 200A, 3001 Heverlee, Belgium, (August 2006) (referred to as Lagae et al.), incorporated by reference herein in its entirety.

Iterative Optimization by Multi-Voronoi Coverage

The actual generation of the $N_i$ goal positions 320 in the regions $R_i$ follows from an iterative optimization process that builds on a distributed version of the Lloyd algorithm and the CVT computation. The Lloyd algorithm is described by S. Lloyd in "Least Squares Quantization in PEM," published in the Information Theory, IEEE Transactions of, 28(2) pages 129-137, (March 1982) (referred to as Lloyd), incorporated by reference herein in its entirety. The CVT computation is described by Q. Du, V. Faber, and M. Gunzburger in "Centroidal Voronoi Tessellations: Applications and Algorithms," published in the SIAM Review, 41, pages 637-676, (December 1999) (referred to as Du et al.), incorporated by reference herein in its entirety. The multi-Voronoi coverage method, which adjusts the Voronoi coverage algorithm as described by Bullo et al. to the specific problem by dividing the optimization problem into M separate optimizations. The $N_i$ goal positions act as the generators for the CVT computation in each of the optimizations in $C_i, \forall i \in I_R$. Note that the M partitions are independent and the optimizations may run in parallel.

Starting from the initial configuration of the goal positions 320 $P_i = \{p_j^i, j \in I_i = [1,N_i]\}$ each cell of the Voronoi partition $\mathscr{V}(P_i) = \{V_1^i, \ldots, V_{N_i}^i\}$ of $C_i$ is given by $$V_j^i = \{q \in C_i | \|q - p_j^i\| \leq \|q - p_k^i\|, \forall j \neq k \in I_{R_i}\}, \quad (3)$$

For the mass density function $\rho_i$, the mass centroids of the resulting Voronoi regions are given by $$C_j^i = \frac{L_j^i}{M_j^i}, \quad \forall V_j^i \mathscr{V}(P_i), \quad (4)$$

with $$M_j^i = \int_{V_j^i} \rho_i(q) dq, \quad L_j^i = \int_{V_j^i} q \rho_i(q) dq. \quad (5)$$

Finally, the current position of the goal is updated to the centroid of its region, $p_j^i = C_j^i$ The resulting CVT is a minimizer of the cost function $\Sigma_{j=1}^{N_i} \int w_j^i \|q - p_j^i\|^2 \rho_i(q) dq$, where $\cup_{j \in I_i} W_j^i$ is a partition of the space $C_i$ and $p_j^i$ the position of the generators. After convergence, a final configuration $\mathscr{P}_G = \{p_j^i, i \in I_R, j \in I_i\}$ with goal positions 320 uniformly distributed in each of the regions of interest is obtained.

The goal positions 320 are given for a unit square grid $\mathscr{D} = [0,1] \times [0,1]$ for generators of zero size. In order to account for the robots' finite physical size, resizing is required. The goal positions 320 are rescaled to guarantee collision-free placement of the robots. The new positions of the goals is given by $$\mathscr{G} = \{K_r p, p \in \mathscr{P}_G\}, \quad (6)$$

where $K_r$ is the size of the display screen. To guarantee feasibility of the goal positions 320, the minimum width of a screen $K_r$ must satisfy $$K_r \geq 2r_A \frac{1}{d_{min}(p,q)}, \quad (7)$$

where $r_A$ is the radius of the robot and $d_{min}(p,q)$ is the minimum distance between any pair of goal positions 320. Following a more conservative approach, selecting a value of $2K_r$ furthermore ensures accessibility to all goal positions 320.

In one embodiment, optimization energy is used as a measure for uniform distribution and visually appealing placement of the final goal positions 320. Faster convergence and smaller oscillations in energy are typically observed for the case of convex objects. In the case of non-convex objects, concavity of a region $R_i$ may result in goal positions that lie outside $R_i$, or coincide with other goal positions 320. Such overlap is avoided if $C_i \cap C_j = \emptyset \forall i, j \in I_R$ holds.

Note that in the following description, the subindex $i \in I = [1, N]$ represents the robot index, $j \in I$ the goal position index and $k \in \mathbb{N}$ the time index of the controller. Let $p_i^k$ denote the position of robot i at time step k and $\mathscr{P}_k = [p_1^k, \ldots, p_N^k]$ the set containing the positions of all robots at time step k.

The limits of the linear and angular velocity for a differentially-driven robot is considered are given by $$|v(t)| \leq v_{max,\omega} = v_{max} - |\omega(t)|\frac{l_w}{2}, \quad (8)$$

$$|\omega(t)| \leq \omega_{max} = \frac{2v_s^{max}}{l_w K_v}, \quad (9)$$

where $v_{max} = \frac{v_s^{max}}{K_v}$ is the maximum speed of the robot, $K_v$ a conversion factor and the wheel speed is bounded by $$-v_s^{max} \leq v_s(t) = \left(v(t) \pm \frac{l_w}{2}\omega(t)\right)K_v \leq v_s^{max}, \quad (5)$$

with $v_s(t)$ the angular velocity of the right and the left wheel respectively (addition, subtraction) and $l_w$, the inter-wheel distance.

Although the method described is derived for differentially-driven robots, the same techniques extend to holonomic robots with some trivial simplifications. In particular, both the goal assignment and preferred velocity computation are independent of the kinematics of the robot.

In each iteration each robot i is uniquely assigned to a goal position $g_j \in \mathcal{G}$, so that a global cost function C is minimized. The cost function is defined in Equation (14) below.

The goal assignment function $\hat{\sigma}_k^*$, which uniquely assigns each robot to a goal position, is defined as $$\hat{\sigma}_k^* = \underset{\hat{\sigma}_k}{\operatorname{argmin}} C(\hat{\sigma}_k), \quad (10)$$

where $$\hat{\sigma}_k: \mathcal{P}_k \to \mathcal{G}, \, p \mapsto g \quad (11)$$

is a bijective map between the current robot positions and the goal positions. Thus, the assignment function $\hat{\sigma}_k$ can also be defined as a permutation $\sigma_k$ of the elements of I, where $\hat{\sigma}_k(p_i^k) = g_{\sigma_k(i)}$. In particular, $\hat{\sigma}_k^*(p_i^k) = g_{\sigma_k^*(i)} = g_j$.

Denote by $\Sigma_I$ the set of permutations of elements of I and $\hat{\Sigma}_k$ the set of goal assignment functions at iteration k. Note that the permutation function $\sigma_k \in \Sigma_I$ is intrinsically independent of the iteration, whilst the assignment function $\hat{\sigma}_k \in \hat{\Sigma}_k \subset \hat{\Sigma} = \bigcup_{n \in \mathbb{N}} \hat{\Sigma}_n$, clearly depends on it. A functional F linking the permutation functions with the assignment functions at a given time is defined as, $$F: \Sigma_I \times \mathbb{N} \to \hat{\Sigma}(\sigma_k, r) \mapsto \hat{\sigma}_r, \quad (12)$$

where $\sigma_r = \hat{\sigma}_k \in \Sigma_I$ is the permutation function associated to the assignment function $\hat{\sigma}_k$, and which is equal to that associated to $\hat{\sigma}_k$ at time step k, thus $$\hat{\sigma}_r = F(\sigma_k, r) \Leftrightarrow \sigma_r = \sigma_k. \quad (13)$$

The assignment function is referenced in following descriptions.

The cost function is defined as the sum over all robots of the square distance to their respective goals, $$C(\hat{\sigma}_k) = \sum_{i \in I} \|g_{\sigma_k(i)} - p_i^k\|^2, \quad (14)$$

where $\|x\|$ is the Euclidean norm of x.

Other considered cost functions, which provide inferior results, are the following ones:

Sum of distances to goal: With similar properties to the chosen cost function it presents as main disadvantage an increase in the time to convergence of the group. Moreover, deadlocks are more likely to appear.

$$C_{dist}(\hat{\sigma}_k) = \sum_{i \in I} \|g_{\sigma_k(i)} - p_i^k\| \quad (15)$$

Orientation penalty: The cost for each robot and goal is given by the sum of two factors, the first proportional to the distance to the goal and the second proportional to the angular difference between the robot orientation and the direction towards the goal. This cost formulation could be expected to produce trajectories with lower angular variation, but it can be seen to introduce undesired oscillations and extreme changes in the direction of movement.

$$C_{ang}(\hat{\sigma}_k) = \sum_{i \in I} \left(\|g_{\sigma_k(i)} - p_i^k\|^2 + \alpha \Delta\theta_{\sigma_k(i),i}\right), \quad (16)$$

where $\alpha$ is a fixed parameter and represents the weight of the angular penalty and $\Delta\theta_{\sigma_k(i),i}$ is the angular difference between the current orientation of robot i and the vector given by $g_{\sigma_k(i)} - p_i^k$.

Sum of expected traveled squared distance to goal: This cost function is not needed in our scenarios as they are obstacle-free (otherwise the geodesic distance could be used). In addition the trajectories of the differentially-driven robots are close to straight line.

An optimal solution of this classical assignment problem is given by the centralized Kuhn-Munkres assignment algorithm which presents at best $\mathcal{O}(n^3)$ cost and is computationally too expensive for large groups of robots. The Kuhn-Munkres assignment algorithm is described by H. W. Kuhn in "The Hungarian Method for the Assignment Problem," published in the Naval Research Logistics, volume 2, pages 83-97, (1955) (referred to as Kuhn), incorporated by reference herein in its entirety. Alternative methods are based on the Auction algorithm. The Auction algorithm is described by D. P. Bertsekas in "The Auction Algorithm: A Distributed Relaxation Method for the Assignment Problem," published in the Annals of Operations Research, 14(1), pages 105-123, (1988) (referred to as Bertsekas), incorporated by reference herein in its entirety. Methods based on the Auction algorithms produce sub-optimal solutions, as close to the optimum as desired, in significantly lower time. Moreover these algorithms scale very well with the number of robots and can be distributed. In one embodiment of the DisplaySwarm a Jacobiversion forward auction with δ-scaling based on the Auction algorithm is implemented.

A forward auction algorithm is an iterative algorithm producing a sequence of price vectors and assignments. The algorithm mainly consists of two parts: a bidding phase where each robot finds a goal with minimal cost and computes a bidding increment higher than δ, and an assignment phase where, for each goal, its highest bidder is computed and assigned. This process continues until all robots have been assigned. In order to accelerate the computation, the algorithm is applied several times while decreasing the parameter δ. It is guaranteed that the assignment of each robot differs in less than δ from the optimal assignment and that the algorithm completes in finite time.

For scenarios with strong noise component, the goal assignment scheme can be modified by adding a hysteresis factor. The optimal assignment $\hat{\sigma}_k^*$ at iteration k is compared with the one of the previous iteration $F(\sigma_{k-1}^*, k)$ and only kept if it represents a decrease in cost of at least δC, factor depending on the noise component and δ. This also avoids undesired oscillations due to the sub-optimality of the goal assignment.

The transformation of an image into a set of goal positions offers the advantage of faster computation enabling real time application, but it also presents a disadvantage, which is a decrease in flexibility to represent a given pattern. In fact, the multi-Voronoi based coverage method leads to a local optimum of the representation, therefore there might be several other solutions which might be closer to the current positions of the robots.

To overcome this problem, a set of goal positions 320 can be defined for a given pattern, $$\mathcal{\hat{G}} = [\mathcal{G}_1, \ldots, \mathcal{G}_{N_g}], \quad (17)$$

where $N_g$ different sets of goal positions 320 $\mathcal{G}_{s \in [1, N_g]}$ are independently generated. Due to the randomized nature of the algorithm the sets of goal positions 320 might be different, representing several local optimal representations of the patterns.

In this case, the goal assignment 325 follows the rule, $$\hat{\sigma}_k^* = \underset{\hat{\sigma}_k^s}{\mathrm{argmin}} C(\hat{\sigma}_k^s), s \in [1, N_g] \quad (18)$$

First, the optimal assignment is obtained for each of the sets of goals $\mathcal{G}_s$ following Equation (10). Second, the optimal assignment with lowest cost among all the sets of goals is chosen. This leads to an increase in complexity of the algorithm proportional to $N_g$.

The computational cost of the assignment is linear in $N_g$. For simplicity $N_g$ is chosen to be equal to one for the following description. Therefore, only one set of goal positions 320 is computed for each pattern. A trade-off approach is to select a set of goals in the first step of the iterative control and keep it constant. This approach would increase the flexibility of the system without compromising the computational time.

In each timestep k, a preferred velocity $\hat{v}_{pref_i}^k$ is selected by each robot i without taking into account the other robots.

The ideal preferred velocity $\hat{v}_{pref_i}^k$ given by a simple proportional controller towards its assigned goal $$v_{pref_i}^k = V_p \min\left(1, \frac{\|g_{\sigma_k^*(i)} - p_i^k\|}{K_a}\right) \frac{g_{\sigma_k^*(i)} - p_i^k}{\|g_{\sigma_k^*(i)} - p_i^k\|}, \quad (19)$$

where the constant $V_p > 0$ the preferred speed of the robot and $K_a > 0$ the distance to the goal from which the preferred velocity is reduced linearly. In order to guarantee convergence without oscillations, must verify $K_a$ must verify $K_a \geq V_p \Delta t$, where $\Delta t$ is the time step of the controller.

Figure 3B:
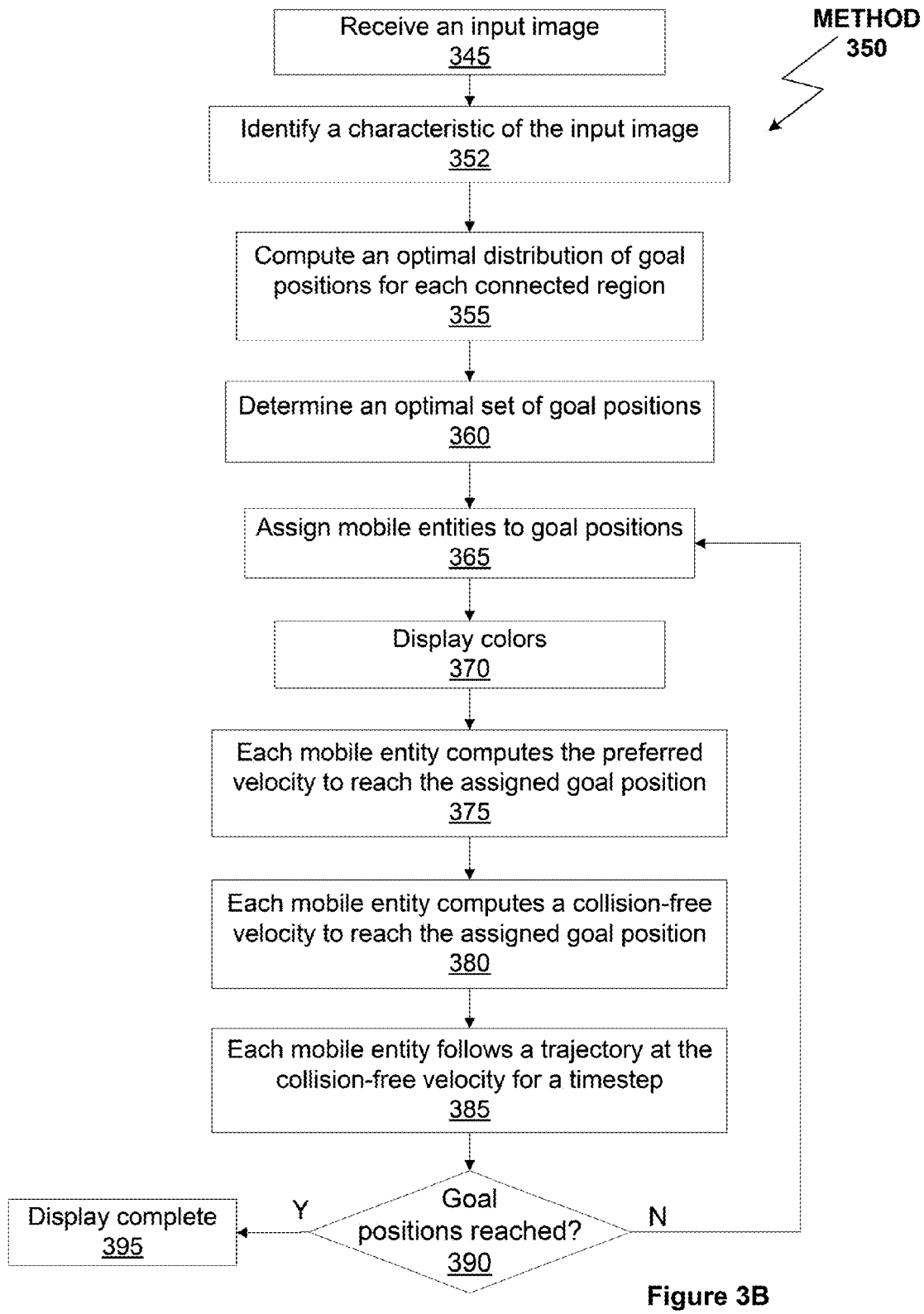
FIG. 3B is a flowchart of method steps describing an algorithm for controlling multiple agents to form an image, according to one embodiment of the invention.

FIG. 3B is a flowchart of method steps 350 describing an algorithm for controlling multiple entities (e.g., agents, robots, or other mobile objects) to form a visual representation of an image, according to one embodiment of the invention. At step 345 the DisplaySwarm system receives an input image. At step 352 the DisplaySwarm system identifies one or more characteristics of the input image. Example characteristics include a connected region, shapes that correspond to facial features, e.g., eyes, nose, mouth, shadows, a silhouette boundary of a face or facial feature, and the like. At step 355 the DisplaySwarm system computes an optimal distribution of goal positions for each connected region. The DisplaySwarm may compute the optimal distribution of the goal positions using the multi-Voronoi based coverage algorithm.

At step 360 the optimal set of goal positions is determined by the DisplaySwarm system. At step 365 the DisplaySwarm system assigns each one of the mobile entities to a goal position, so that a different goal position is assigned to each one of the mobile entities. The DisplaySwarm may assign the goal positions to the mobile entities using the Auction algorithm. At step 370 the mobile entities in the DisplaySwarm system display a color based on the respective goal position that as assigned to the mobile entity.

At step 375 each mobile entity in the DisplaySwarm system independently computes a preferred velocity to enable the mobile entity to reach the assigned goal position. At step 380 each mobile entity independently computes a collision-free velocity to enable the mobile entity to reach the assigned goal position. The DisplaySwarm may compute the collision-free velocities using the NH-ORCA algorithm.

At step 385 each mobile entity independently follows a trajectory at the collision-free velocity for a timestep. At step 390 the DisplaySwarm system determines if all of the goal positions have been reached, and, if so, the display of the visual representation of the input image is complete. A goal position is considered to have been reached when the current position of the mobile entity assigned to the goal position coincides with the goal position or is within a fixed maximum error value, $\mathcal{E}_t$, of the goal position. Otherwise, the DisplaySwarm system returns to step 365 to reassign the mobile entities to the goal positions to repeat steps 365, 370, 375, 380, 385 and 390 for another timestep. In one embodiment, the mobile entities are robots which are able to move in three-dimensional space. For example, robots may fly or adhere to a wall or ceiling. The mobile entities may be capable of sensing the environment and may be configured to react to the environment.

Reciprocal Collision Avoidance for Multiple Non-Holonomic Robots

For each robot, given a preferred velocity $\hat{v}_{pref_i}^k$ and the current velocities and positions of its neighbors, a collision-free velocity $\hat{v}_{cf_i}^k$ and appropriate differential-drive controls are computed. In order to avoid collisions while guaranteeing smooth motions, a local optimal reciprocal collision avoidance in velocity space based on velocity obstacles, such as the technique described by P. Fiorini and Z. Shillert in "Motion Planning in Dynamic Environments Using Velocity Obstacles," published in the International Journal of Robotics Research, 17(7), pages 760-772, (1998) (referred to as Fiorini et al.), incorporated by reference herein in its entirety, may be implemented, which exploits the fact that all controlled robots in the environment react following the same scheme. For holonomic robots, a technique described in van den Berg et al. may be implemented. The kinematic constraints of non-holonomic robots are taken into account by Alonso-Mora et al. are also taken into account in NH-ORCA. The kinematic constrains of non-holonomic robots that are accounted for is described by A. Alonso-Mora, Breitenmoser, M. Rufli, P. Beardsley, and R. Siegwart in "Optimal Reciprocal Collision Avoidance for Multiple Non-holonomic Robots," published in the Proceedings of the International Symposium on Distributed Autonomous Robotics Systems, (2010) (referred to as Alonso-Mora et al.), incorporated by reference herein in its entirety.

The NH-ORCA method links a non-holonomic robot with a holonomic one in order to extend the concepts presented in van den Berg et al. In particular, a differentially-driven robot is considered that tracks a holonomic trajectory given by a velocity vector. By limiting the set of velocity vectors and trajectories of the differentially-driven robot it can be guaranteed that tracking is achieved within a fixed maximum error $\mathcal{E}_t > 0$.

Consider known $\mathcal{E}_t$ for each robot i which guarantee for every pair of robots that there is no overlap of the extended radius, $(r_i + \mathscr{E}) + (r_j + \mathscr{E}_j) \leq \|p_i^k - p_j^k\|$, where $r_i$, $r_j$ represent the radius of robots i, j. This is achieved by having a desired value of the maximum error and decreasing it step-wise when robots are close to each other so that the previous equation holds.

The set of collision-free velocities in horizon $\tau_i$ for robot $R_i$, $ORCA_i^\tau$ is given by $$ORCA_i^\tau = S_{AHV_i} \cap \bigcap_{j \neq i} ORCA_{i|j}^\tau, \qquad (20)$$

where $S_{AHV_i}$ is the set of allowed holonomic velocities for which tracking within $\mathscr{E}_i$ error is guaranteed and $ORCA_{i|j}^\tau$ is the set of collision-free velocities for horizon $\tau_i$ for a holonomic robot at position $p_i^k$, radius $r_i + \mathscr{E}$ and current velocity $v_{cf_i}^{k-1}$ with respect to a holonomic robot at position $p_j^k$, radius $r_j + \mathscr{E}_i$ and current velocity $v_{cf_j}^{k-1}$. This set of velocities is computed from the velocity obstacle created by robot $R_j$ for robot $R_i$ as follows. For holonomic robots the velocities are limited by a maximum value, thus $S_{AHV_i} = D(0, V_{H_i}^{max})$; for differentially driven robots a polygonal approximation of $S_{AHV_i}$ is derived, as described in Alonso-Mora et al.

Figure 4:
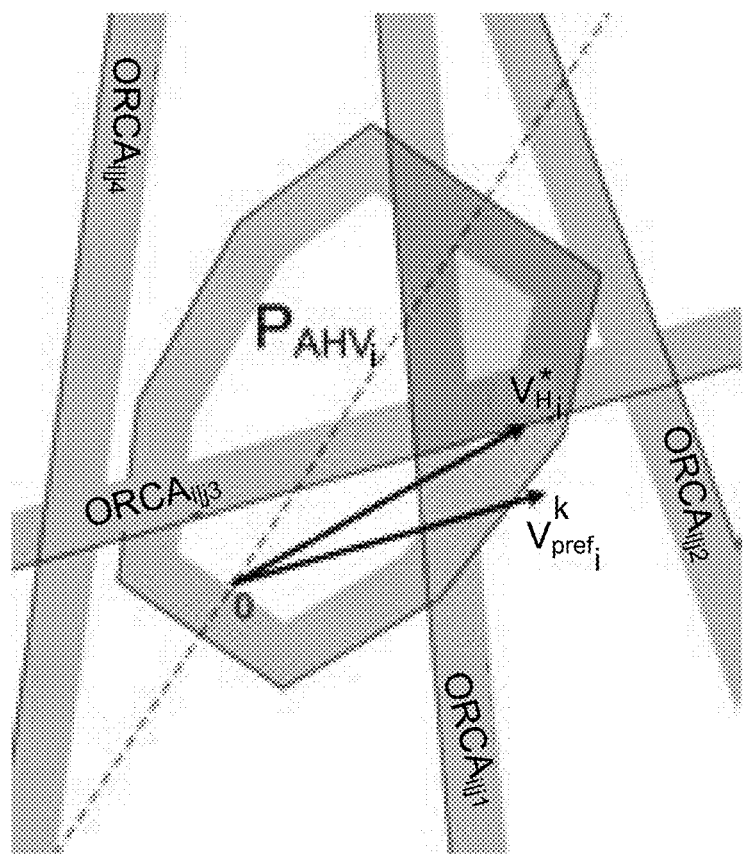
FIG. 4 illustrates the NH-ORCA optimization in velocity space for a differentially-driven robot in a scenario with five robots, according to one embodiment of the invention.

FIG. 4 illustrates the NH-ORCA optimization in velocity space for a differentially-driven robot in a scenario with five robots, according to one embodiment of the invention. FIG. 4 shows the set $ORCA_i^\tau$ for a configuration with multiple robots, where $S_{AHV_i}$ is approximated by the convex polygon $P_{AHV_i}$ for a differentially-driven robot.

For clarity of exposition the notation is simplified. Consider two holonomic robots i and j of radius $r_i$ and $r_j$ at positions $p_i$ and $p_j$ and subject to current velocities $v_{Hi}$ and $v_{Hj}$. The velocity obstacle for robot i induced by robot j is defined as the set of relative velocities $\bar{v} = v_{H_i} - v_{H_j}$ leading to collision $$VO_{i|j}^\tau = \{\bar{v} | \exists t \in [0, \tau], t \cdot \bar{v} \in D(p_j - p_i, r_i + r_j)\}, \qquad (21)$$

with $D(p, r) = \{q | \|q - p\| < t\}$ the open ball of radius r. The set of collision-free velocities $ORCA_{i|j}^\tau$ for robot i with respect to robot j can geometrically be constructed from $VO_{i|j}^\tau$. First, the minimum change in velocity that needs to be added to $\bar{v}$ to avoid a collision, $$u = \left( \underset{v \in \partial VO_{i|j}^\tau}{\mathrm{argmin}} \|\bar{v} - (v_i^{opt} - v_j^{opt})\| \right) - (v_i^{opt} - v_j^{opt}), \qquad (22)$$

is computed, where $v_i^{opt}$ is the optimization velocity, set to the current velocity $v_{H_i}^{current}$ of the robot. This choice of $v_i^{opt}$ gives good results.

Then $$ORCA_{i|j}^\tau = \{v_{H_i} | (v_{H_i} - (v_i^{opt} + cu)) \cdot n \geq 0\}, \qquad (23)$$

follows as described by van den Berg et al. n denotes the outward normal of the boundary of $VO_{i|j}^\tau$ at $(v_i^{opt} - v_j^{opt}) + u$, and c defines how much each robot gets involved in avoiding a collision.

$$c = \frac{1}{2}$$

means both robots i and j help to equal amounts to avoid colliding with each other; c=1 means robot i fully avoids collisions with a dynamic obstacle j. Likewise, the velocity obstacle can be computed for static obstacles following the technique described by van den Berg et al.

The optimal holonomic velocity for robot i is to be found as $$v_{H_i}^* = \underset{v_{H_i} \in ORCA_i^\tau}{\mathrm{argmin}} \|v_{H_i} - v_i^{pref}\|. \qquad (24)$$

This is an optimization with linear constraints which can be solved efficiently. In case of unfeasibility, first the symmetrical mirrored polygon to $P_{AHV_i}$ within $S_{AHV_i}$ is used. This represents a movement in opposite direction to that of the desired goal. If the problem remains unfeasible, the time horizon is decreased for that time step till the problem becomes feasible. As described by van den Berg et al., this is a 3-D linear program which is always feasible and that can be solved by a randomized algorithm running in $\mathscr{O}(n_i)$ expected time for each robot i, where $n_i$ is the number of neighbouring robots. In our case, if the time horizon goes below a given threshold the robot is stopped for that time-step.

Finally, the selected holonomic velocity is mapped to the corresponding non-holonomic control inputs, which guarantee collision-free motion. The optimal controls are given by $$\omega = \min\left( \frac{\theta_H}{T}, \omega_{max} \right)$$

and $v = \min(v_\mathscr{E}^*, v_{max, \omega})$, where $v_\mathscr{E}^*$ is the linear velocity that minimizes the tracking error for $$\omega = \left( \frac{\theta_H}{T} \right).$$

A detailed description of the algorithm is provided in TABLE 1, below.

Multi-Density Voronoi Coverage

The Voronoi coverage method is proposed as a method to obtain an optimal set of goal positions for the robots. It is well-known that the Lloyd algorithm can also be used as a control method for robots as described by Bullo et al.

If the Voronoi coverage method is used as control method, the initial positions are given by the current positions of the robots in the scenario, normalized to Q. Consider the convex scenario $\mathscr{Q}$ containing M (non-intersecting) regions $R_i$, $i \in [1, M]$, each region being a connected (possibly non-convex) pattern where a distribution of $N_i$ robots is desired ($\Sigma_{i=1}^M N_i = N$ the total number of robots).

This is the original method presented by Bullo et al., where a single tessellation of the space is computed. Thus, $$\underset{\{W_j\}_{j=1}^N, \{p_j\}_{j=1}^N}{\mathrm{argmin}} \sum_{j=1}^N \int_{W_j} \|q - p_j\|^2 \rho(q) dq, \qquad (37)$$

where $\{W_j\}_{j=1}^N$ is an N-partition of the space $\mathscr{Q}$, $p_j$ the position of the generators and $\rho(q)$ the mass density function with maximum value in $\cup_{i=1}^M R_n$ and decreasing outside. It can be seen that the centroidal Voronoi partition is the optimal partition of $\mathscr{Q}$.

Convergence to local optima is guaranteed, nevertheless there is no guarantee that $N_i$ robots will represent pattern i.

The final distribution strongly depends on the initial robot configuration and the existence of connected regions where robots can get trapped in a local optima The multi-Voronoi coverage method is based on the Voronoi method that has been used in this work for obtaining the goal positions. Thus, $$\underset{\{W_j^i\}_{j=1}^{N_i},\{p_j^i\}_{j=1}^{N_i}}{\operatorname{argmin}} \sum_{j=1}^{N_i} \int_{W_j^i} \|q - p_j^i\|^2 \rho_i(q) dq, \quad (38)$$

$$\forall i \in [1, M],$$

where $\{W_j^i\}_{j=1}^{N_i}$ is an $N_i$-partition of the space $\mathscr{D}$, $p_j^i$ the position of the generators and $\rho^i(q)$ a mass density function with maximum value in $R_i$ and decreasing outside. Likewise to the previous case, the centroidal Voronoi partitions are optimal. In each step $N_i$ robots are optimally assigned to each region $R_i$.

Convergence to local optimum in each region and thus a homogeneous distribution of $n_i$ robots within each pattern $R_i$ is guaranteed, nevertheless collision and overlapping of robots might occur.

An alternative approach, referred to as a multi-density Voronoi coverage technique assigns $N_i$ robots to each region $R_i$ similar to the method previously described, but computes a unique N-Voronoi partition of the space. Thus, $$\underset{\{V_j\}_{j=1}^{N},\{p_j\}_{j=1}^{N}}{\operatorname{argmin}} \sum_{j=1}^{N} \int_{V_j} \|q - p_j\|^2 \rho_i(q) dq, \quad (39)$$

Where $\{V_j\}_{j=1}^{N}$ is a centroidal Voronoi partition of $\mathscr{D}$, $p_j$ the position of the generators and $\rho^i(q)$ a mass density function with maximum value in $R_i$ and decreasing outside. The robots at positions $p_j$ are optimally assigned to each of the regions $R_i$ minimizing the total distance and guaranteeing that $N_i$ robots are uniquely assigned to each region. In this case the partition V of $\mathscr{D}$ is chosen to be a Voronoi partition for simplicity of computation (an extension of the Lloyd algorithm applies), but it is not the optimal partition of $\mathscr{D}$ in this context. The method has the advantage of taking into account the positions of all other robots during optimization and gave very good results as well in all of our tests with different patterns, including the ones presented in this work. On the other hand, when the method is used for the goal generation in Display Swarm adverse effects were observed for the video display. As the goal positions influence each other, moving positions cause small oscillations in the goal positions of static image parts like the flower in FIG. 2B.

One step further is to proceed based on computing unique N-Voronoi partitions, but not to impose a Voronoi partition of the space this time. Thus, $$\underset{\{W_j\}_{j=1}^{N},\{p_j\}_{j=1}^{N}}{\operatorname{argmin}} \sum_{j=1}^{N} \int_{W_j} \|q - p_j\|^2 \rho_i(q) dq, \quad (40)$$

where $\{W_j\}_{j=1}^{N}$ is a partition of $\mathscr{D}$ and $p_j \in W_j$, $p_j$ the position of the generators and $\rho^i q$ the mass density function computed for $R^i$. The robots at positions $p_j$ are optimally assigned to each of the regions $R_i$ minimizing the total distance and guaranteeing that $N_i$ robots are uniquely assigned to each region.

Figure 5:
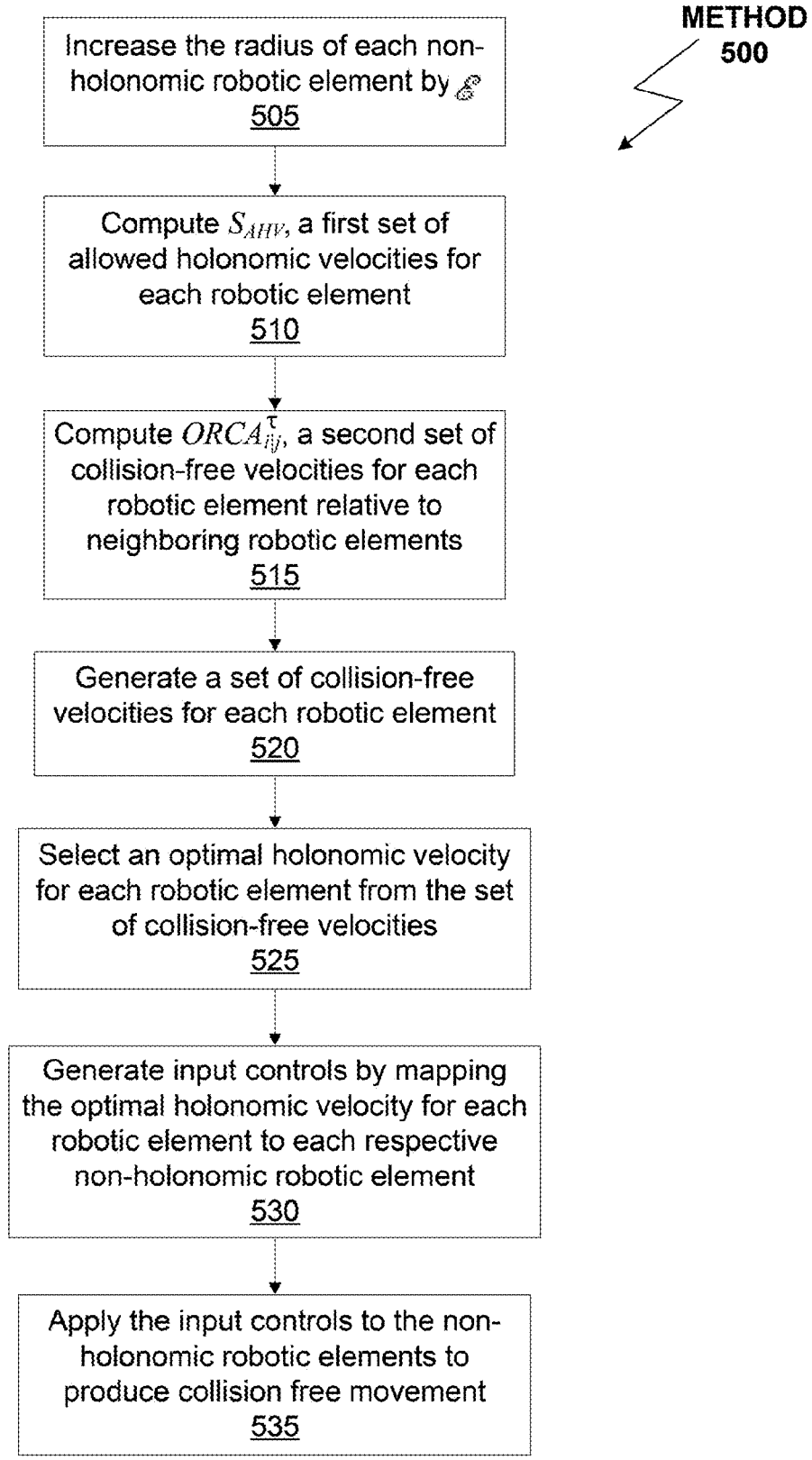
FIG. 5 is a flowchart of method steps describing an algorithm for non-holonomic reciprocal collision avoidance, according to one embodiment of the invention.

FIG. 5B is a flowchart of method steps 500 describing an algorithm for non-holonomic reciprocal collision avoidance, according to one embodiment of the invention. At step 305, the radius of each non-holonomic robot is increased by the maximum tracking error, $\mathscr{E}$. The computations for steps 310, 315, 320, and 325 are performed for holonomic robots that each correspond to a respective non-holonomic robot. In other words, the non-holonomic robots are viewed as holonomic robots for those computations. At step 310, $S_{AHV_i}$, the set of allowed holonomic velocities is computed for each robot i using equation (41) and fixed values for the maximum tracking error $\mathscr{E}_i$ and $T_i$. Each set of allowed holonomic velocities is approximated by a convex polygon $P_{AHV_i}$.

At step 315, $ORCA_{i|j}^{\tau}$, a set of collision-free velocities is computed for each robot i relative to each neighboring robot j using equation (23) and the increased radii for each respective non-holonomic robot. At step 320, a set of collision-free velocities for each robot i, $ORCA_i^{\tau}$ is generated from the set of collision-free velocities computed in step 315 using equation (20) and the set of allowed holonomic velocities computed in step 310. At step 325 an optimal holonomic velocity is selected for each robot i, from the set of collision-free velocities generated in step 320 by evaluating equation (24). At step 330, the input controls for each robot are generated by mapping the optimal holonomic velocities for the robot to the corresponding non-holonomic robot. At step 335, the input controls are applied to the non-holonomic robots to produce collision-free movement. The steps shown in method 300 may be repeated for different time steps.

The control inputs that are generated in step 330 include $(v, \omega)$ and the control inputs are selected for optimal tracking of a given holonomic velocity $v_H$ are found. The controls for the non-holonomic robot are chosen as those that minimize the tracking error $\epsilon_H$, while achieving the correct orientation in the fixed given time T. If this is impossible due to the robot's constraints, the robot performs a turn in place by rotating at maximum speed until the correct orientation is reached, i.e.

$$\omega = \min\left(\frac{\theta_H}{T}, \omega_{max}\right).$$

In general, $t_1$, $\theta_H$ and $\omega$ are related by $$\omega = \frac{\theta_U}{t_1}.$$

TABLE 1 illustrates pseudocode for implementing the method steps 500 shown in FIG. 5B.

TABLE 1

Algorithm 1 Non-Holonomic Reciprocal Collision Avoidance.

Require: Fixed $\mathscr{E}_i$ and $T_i$. Group of differential-drive robots $i \in [1,n]$ provided with:
- internal parameters: $p_i$, $v_{H_i}^{current}$, $\theta_i$, $v_i^{pref}$, $r_i$, $\mathscr{E}_i$, $T_i$.
- external parameters (obtained from sensing or communication): $p_j$, $v_{H_j}^{current}$, $r_j + \mathscr{E}_j$ with $j \neq i$.
1: Compute $P_{AHV_{i,0}}$ from closed-form expression of $S_{AHV_{i,0}}$ and zero orientation, Eq. (13).
2: loop
3:     for $i \in \{1,...,n\}$ do TABLE 1-continued Algorithm 1 Non-Holonomic Reciprocal Collision Avoidance.

Figure 6:
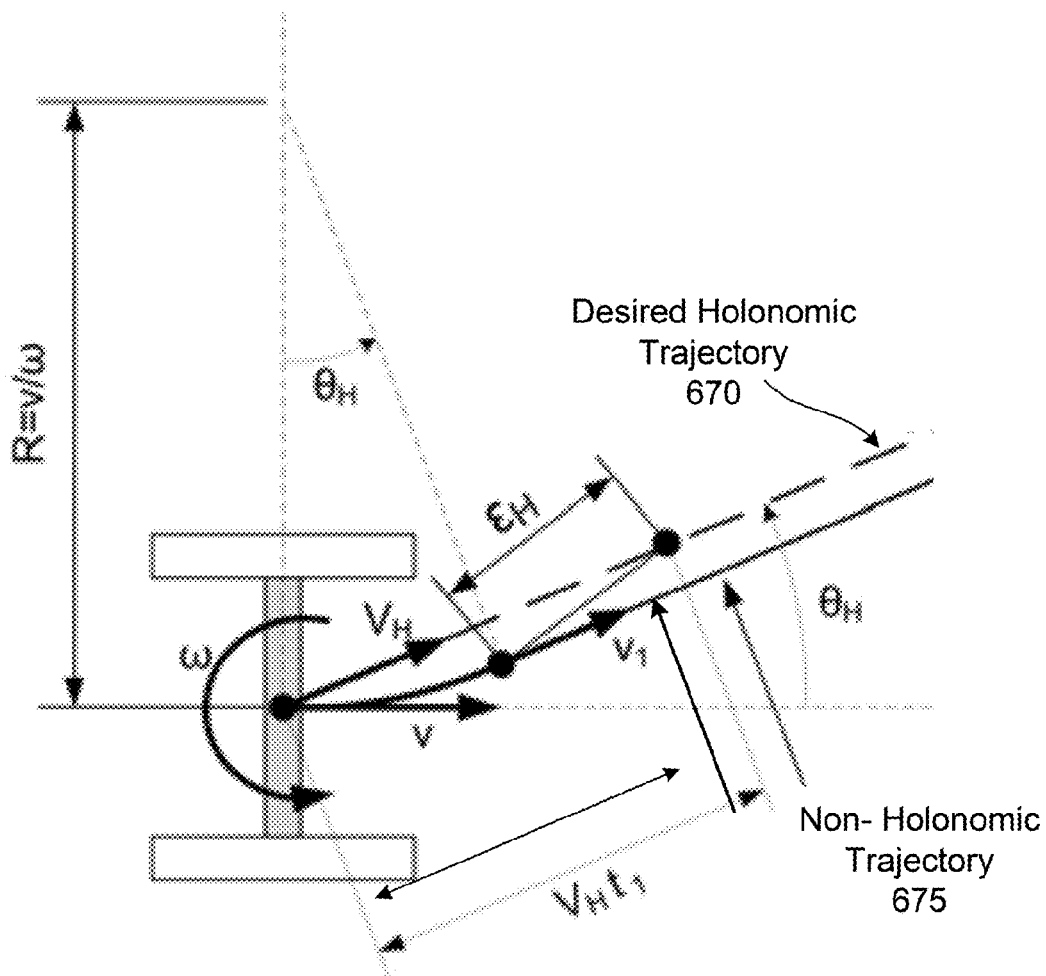
FIG. 6 illustrates the non-holonomic tracking error, according to one embodiment of the invention.

4:  Compute $P_{AHV_i}$ by rotating $P_{AHV_{i,0}}$ to match orientation $\theta_i$.
5:  for $j \in \{1,...,n\}, j \neq i$ do
6:   Compute $VO_{ij}^{\tau}$ for holonomic robots of radius $r_i + \mathscr{E}_i$
   and $r_j + \mathscr{E}_j$ at $p_i$ and $p_j$ with $v_{H_i}^{current}$ and $v_{H_j}^{current}$.
7:   Compute $ORCA_{ij}^{\tau}$.
8:  end for
9:  Construct $ORCA_i^{\tau} = P_{AHV_i} \cap \cap_{i \neq j} ORCA_{ij}^{\tau}$.
10:  Compute optimal collision-free holonomic velocity $v_{H_i}^*$
  following Eq. (7).
11:  Map $v_{H_i}^*$ to $(v_i, \omega_i)$ following Eq. (9).
12:  Apply controls.
13: end for
14: end loop FIG. 6 illustrates the non-holonomic tracking error $\mathscr{E}$, according to one embodiment of the invention. For simplication of analysis, the basic trajectories of the non-holonomic robots considered are defined by two segments. First, an arc of circumference at constant linear and angular speed is traversed until the robot achieves the orientation $\theta_H$ of $v_H$. The arc is followed by a straight line segment at constant linear speed $V_H = \|v_H\|$ along a non-holonomic trajectory 675, as illustrated in FIG. 6. Trajectory 670 is the holonomic trajectory. As shown in FIG. 6, the maximum tracking error is committed at the end of the arc, when the robot achieves the correct orientation at time $t_1$ and remains constant onwards. In this formulation the robots have no constraints in acceleration, nevertheless such constraints could be easily included by adding to the complexity of the formulation.

The set of non-holonomic controls $S_{NHC}$ is defined as the subset of the controls $(\mu(t), \omega(t))$ given by the non-holonomic trajectory 675 and satisfying the kinematic constraints.

In order to obtain smooth trajectories, the time $t_1$ to achieve the correct orientation $\theta_H$ can be fixed to a minimum value T. To guarantee stability, T must be at least equal to the time step $\Delta t$ of the controller.

For non-holonomic robots and a given maximum tracking error $\mathscr{E}$, the set of allowed holonomic velocities $S_{AHV}$ is defined as the set of the velocities $v_H$ for which there exists a control input within the set of non-holonomic controls $S_{NHC}$ that guarantees a tracking error lower or equal than the given maximum tracking error $\mathscr{E}$ at all times. The set of allowed holonomic velocities is defined as $$S_{AHV} = \{v_H \in \mathbb{R}^2 | \exists (v(\tau), \omega(\tau)) \in S_{NHC}, \|p + \tau \cdot v_H - \hat{p}^k(\tau)\| \leq \mathscr{E} \; \forall \tau \geq 0\}, \quad (41)$$

where $\hat{p}^k(\tau)$ is the expected robot position at time $k\Delta t + \tau$ if controls $(v(\tau), \omega(\tau))$ are applied at time $k\Delta t$.

For the given kinematics and basic trajectories the closed form of the border of $S_{AHV}$ is found.

The maximum holonomic speed $V_H^{max}$ that can be tracked with $\epsilon_H \leq \mathscr{E}$ for a fixed $\theta_H$ by a differentially-driven robot with zero orientation is given by the following equations, For $\dfrac{\theta_H}{T} \leq \omega_{max}$ and $v_{\mathscr{E}}^* \leq v_{max,\omega}$ by  (42)

$$V_H^{max} = \min\left(\dfrac{\mathscr{E}}{T} \sqrt{\dfrac{2(1-\cos(\theta_H))}{2(1-\cos(\theta_H)) - \sin^2(\theta_H)}}, v_{max}\right),$$

where $$v_{\mathscr{E}}^* = \dfrac{\mathscr{E}}{T} \dfrac{\theta_H \sin(\theta_H)}{2(1-\cos(\theta_H))} \sqrt{\dfrac{2(1-\cos(\theta_H))}{2(1-\cos(\theta_H)) - \sin^2(\theta_H)}}.$$

For $\dfrac{\theta_H}{T} \leq \omega_{max}$ and $v_{\mathscr{E}}^* \geq v_{max,\omega}$  (43)

by $V_H^{max} = \left(\dfrac{-\beta + \sqrt{\beta^2 - 4\alpha\gamma}}{2\gamma}, v_{max}\right)$, where $$\alpha = T^2,$$

$$\beta = -\dfrac{2T^2 \sin(\theta_H)}{\theta_H} v_{max,\omega},$$

and $$\gamma = \dfrac{2T^2(1-\cos(\theta_H))}{\theta_H^2} v_{max,\omega}^2 - \mathscr{E}^2.$$

For $\dfrac{\theta_H}{T} \geq \omega_{max}$  (44)

by $$V_H^{max} = \min\left(\dfrac{\mathscr{E} \omega_{max}}{\theta_H}, v_{max}\right)$$

A detailed proof of equations (42), (43), and (44) is found in Alonso-Mora et al.

Finally, due to the complexity of the $S_{AHV}$ it is approximated by a maximal convex polygon $P_{AHV} \subset S_{AHV}$. Note that $S_{AHV}$ is divided in two overlapping and symmetrical convex polygonal approximations. An example of $P_{AHV}$ is given in FIG. 4.

It is desirable for the $S_{AHV}$ to be relatively close to the disk of ideally preferred holonomic velocity.

The preferred velocity computed in each iteration can lie outside of $S_{AHV}$. As previously described $v_{pref_i}^k \in S_{AHV}$ is obtained from the projection to the closest point of $S_{AHV}$ in the Euclidean sense, which works well for robots. An alternative way of computing $v_{pref_i}^k \in S_{AHV}$ is described in the following.

Consider $\hat{v}_{pref_i}^k$ computed as in Section 5.3. Consider now, $v_{pref_i}^k = V_{pref_i}^k (\cos(\theta_{pref_i}^k), \sin(\theta_{pref_i}^k))$ and $\hat{v}_{pref_i}^k = \hat{V}_{pref_i}^k (\cos(\hat{\theta}_{pref_i}^k), \sin(\hat{\theta}_{pref_i}^k))$.

The orientation of the preferred velocity is imposed to be that of $g_{o_k(i)} - p_i^k$, thus $\theta_{pref_i}^k = \hat{\theta}_{pref_i}^k$. The module is then selected as $$V_{pref_i}^k = \max_V \{V \; s.t. \; v_{pref_i}^k \in P_{AHV_i}\}.$$

This is given by intersecting the border of $P_{AHV_i}$ with the ray of orientation $\theta_{pref_i}^k$.

Note that selecting the closest velocity to $\hat{v}_{pref_i}^k$ inside $P_{AHV_i}$ without taking into account the orientation might lead to velocities with lower angular distance to the heading direction, which implies lower angular velocities and thus can result in non-converging spiral paths.

The embodiments described herein provide a reciprocal collision avoidance technique for multiple non-holonomic robots, referred to herein as NH-ORCA. NH-ORCA builds on ORCA, which is an optimal reciprocal collision avoidance technique for holonomic robots. Embodiments are described in the context of differential-drive robots. However, the approach applies more generally for the class of feedback linearizable vehicles with non-holonomic kinematics, such as car-like robots or differentially-driven robots with trailers.

Trajectories planned for the non-holonomic robot are collision-free. Due to the time-discrete implementation, after each time-step a new collision-free trajectory is computed.

Therefore, the trajectories of all agents, given as concatenation of segments, are collision-free.

NH-ORCA guarantees collision-free trajectories for non-holonomic robots but convergence to a goal destination is not fully guaranteed. While robots are in movement, deadlocks will not appear. Nevertheless, when robots reach their goal, their behavior is close to that of static obstacles. If they are approached by another robot, a deadlock situation may result as the robot's velocity that is closest to its preferred velocity might become zero in order to avoid collisions. This is inherited from the original method for holonomic agents (ORCA) and can be resolved by conventional waypoint navigation techniques.

A fast and distributed method for local collision avoidance among non-holonomic robots, so-called NH-ORCA, is presented on the basis of multiple differential-drive robots. Formal proofs of collision-free motion (valid both for continuous and discrete control) are derived. NH-ORCA achieves smooth and visually appealing trajectories for non-holonomic robots to form images as shown in FIG. 2B.

Advantageously, embodiments of the invention described above may be used for collision avoidance among multiple non-holonomic robots. Non-holonomic optimal reciprocal collision avoidance guarantees smooth and collision-free motions. The NH-ORCA technique for producing collision-free motion may be used to by the DisplaySwarm system. The DisplaySwarm system has the potential to make a new impact and to inspire the feeling of a new way of interacting with the world by forming images with robots or other movable entities. Humans are genetically disposed to pay careful attention to their physical environment and especially to moving objects. Furthermore humans tend to ascribe intelligence to a purposefully moving object even if it is a robot. The result is a different type of psychological interaction when viewing a display composed of moving robots compared to conventional displays.

The DisplaySwarm system is modular in the main components—goal generation, goal assignment, path planning, and collision avoidance—so that changes to individual components are insulated. The algorithms scale well with number of robots and support distributed or parallelized computing. Optimal representation of an input image is achieved according to the available number of robots, and an increase in the number of robots increases the detail of the representation.

Robotic Texture

The previous description details techniques for using controllable color to create representational images. However, mobile robots may also be used to create visual effects such as real-world textures. For example, mobile robots with controllable color may create an effect like fire, with the motion of the robots conveying an upward flickering motion, and the colors of the robots showing orange and yellow. Other examples of textures that may be represented with a robot swarm are sunlight on water, leaves fluttering in sunlight, a wheat field swaying in the wind, crowd flow in a busy city, clouds in the sky. The most appropriate types of texture for representation using a robot swarm have cyclic and stochastic motions with little occlusion. The goal for representing textures is not to create exact shapes such as exact shape of individual flames or clouds. Rather the goal is to create an overall visual effect that is suggestive to the viewer of the real-world texture.

Conceptually, each mobile robot is a mobile pixel of controllable color. A video of a real-world texture is analyzed for representation by a small number (e.g. 100) mobile pixels. In one embodiment, each image of the real-world texture is segmented into a specified number of super-pixels and the motion of the super-pixels is determined using optical flow techniques to generate texture characterization parameters, e.g., velocity vectors. Alternatively, low-level or high-level features of the real-world texture images may be tracked. The super-pixel or feature motion is mapped to motion of individual robots, incorporating the physical constraints of the specific robots, and giving precedence to those robots which correspond to strong optical flow in the video of the real-world texture.

A final optimization stage evaluates the similarity between the original real-world texture and the robot motion (in simulation) to refine the robot motion. In another embodiment, the real-world texture is analyzed using dynamic texture synthesis techniques. More specifically, the real-world texture is reduced to a low-dimensional representation and a relatively small number of texture characterization parameters are generated to represent motion and color changes. In contrast with the optical flow technique, the dynamic texture synthesis technique is not constrained to use specific velocity vectors to control movement of the robots. When the dynamic texture synthesis technique is used, the texture characterization parameters may be used to select between different possible motions to control movement of the robots.

The input to the robotic texture system is a video of a real-world texture video, e.g., a dynamic texture, and the output is a performance of the robot swarm to represent that dynamic texture. The primary theoretical challenge stems from the limited pixel budget, requiring a principled approach to determine the distribution and motion of the robot pixels due to having a limited number of pixels, e.g., robots. Goal positions are computed by a simulator that maintains a virtual robot swarm in correspondence with the physical robot swarm. The goal positions are computed based on texture characterization parameters generated using optical flow techniques or on texture synthesis techniques. The simulator is coupled to the controller of the physical robot swarm. A key issue for handling motion reproduction using the simulator is that the motion is subject to physical constraints of realizable robot motion and collision avoidance.

At a high-level, the robotic texture system has three components. The first component initializes the robots and performs an initial synchronization between the second and third components. The second component is the simulator that contains a virtual swarm in correspondence with the physical swarm. The simulator uses the texture characterization parameters to determine a motion update for the robots. The motion update is communicated to the third component which is the physical swarm controller. The physical controller uses the received motion update to drive the physical robots. The physical robots may include any combination of holonomic and/or non-holonomic robots.

Naively, the interaction between the simulator and the physical controller would work in the following way. The simulator obtains the physical robot positions from the physical controller. The simulator then computes the motion update and communicates the motion update to the physical controller. The physical controller uses the motion update to drive the robots and inform the simulator when the transition was complete. The interaction then loops. The problem with such an interaction is that the simulator depends on the update of the physical robot positions and, therefore, the simulator would be waiting for the physical transition to complete before the simulator could begin to compute the next motion update and the physical controller would have to wait until the new motion update is computed. The dependency introduces an unwanted delay in the robotic texture system. To address this issue, in one embodiment, the simulator applies the motion update to virtual robots to predict the result of the motion update on the actual robots.

Figure 7A:
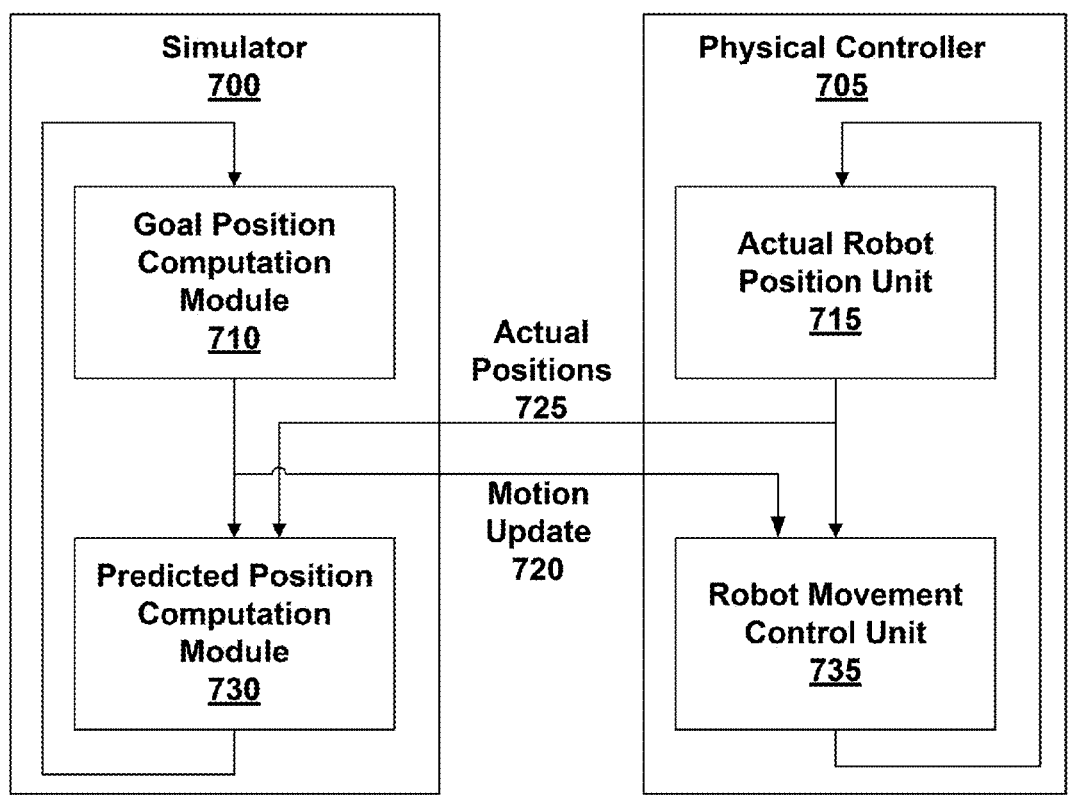
FIG. 7A illustrates a simulator and a physical swarm controller, according to one embodiment of the invention.

FIG. 7A illustrates a simulator 700 and a physical swarm controller 705, according to one embodiment of the invention. After the simulator 700 transmits the motion update 720 to the physical controller 705 (indicated by an arrow in FIG. 7A), the simulator 700 predicts the result of the motion update 720. The simulator 700 then uses the prediction to compute the next motion update, i.e., the simulator 700 assumes that the prediction is a good estimate of the physical transition which will occur. Thus the simulator 700 (which executes more quickly than the physical controller 705) is ready with a new motion update as soon as the physical controller 705 completes the current transition. And the physical controller 705 communicates the true physical positions of the robots after the transition to keep the simulator 700 synchronized with the physical controller 705. Synchronization between the virtual swarm of the simulator 700 and the physical swarm ensures that any error between the estimated positions and the actual positions of the robots does not accumulate over multiple time steps. The loop between the simulator 700 and the physical controller 705 is iterated until every frame of the dynamic texture has been processed.

Input to the system is a dynamic texture, e.g., real-world texture video consisting of a sequence of images $I_t \subset R^2$, where t represents the current frame or time step. Robot positions in the image coordinate frame are denoted as $r^i \in R^2$, while positions in the physical coordinate system are denoted as $p^i \in R^2$, where i denotes the index of the robot. There exists a known transformation between the coordinate frames of the image and the physical swarm.

An initialization routine (not shown) computes an initial configuration of robots and synchronizes with the physical system as follows. Using the available number of robots, the size of the domain, and (optionally) a segmentation mask for a region of interest in the dynamic texture, a Poisson Disk Sampling procedure may be performed to compute a substantially evenly distributed set of initial robot positions $r_0^i$ for the first frame of the dynamic texture. A sanity check is performed that the resulting robot density does not exceed what is physically achievable.

The target or goal positions $r_0^i$ are communicated to the physical swarm controller, which moves the physical robots as close as possible to the desired configuration. The achieved positions $p_0^i$ in the physical world may differ from the idealized goal positions. Hence $r_0^i$ is set equal to $p_0^i$, where $p_0^i$ are the measured (actual) positions of the physical robots, to start with a consistent synchronization between the simulator 700 and the physical controller 705 of the overall robotic texture system.

In one embodiment, for each pair of frames $I_t$ and $I_{t+1}$ of the input dynamic texture, the optical flow field $F_t: R^2 \rightarrow R^2$ is computed by the goal position computation unit 710 using a state-of-the-art optical flow algorithm. $F_t$ provides the dominant motion components that should be reproduced by the robots. Given the predicted position of the robot $r_t^i$, the robot's goal position $g_t^i \in R^2$ is given by the value of the optical flow $F_t(r_t^i)$. In order to filter noise and undesirable small-scale motion, the optical flow is thresholded and robots with optical flow below a given threshold $\|F_t(r_t^i)\| \leq K$ are ignored. Optical flow is a velocity vector in the image coordinate frame which directly determines a desired velocity in the physical coordinate frame. Reducing the desired velocity to a physically achievable motion, if required, is described further herein.

The simulator 700 simulates the driving of the virtual robots to the goal positions, including collision avoidance. The goal position computation unit 710 within the simulator 700 computes a goal position $g_t^i$ for each robot that is then transformed by the predicted position computation unit 730 into a desired velocity $\hat{v}_t^i \in R^2$. Each robot is advected with its associated flow to compute a goal position. The goal update is as given by:

$$g_t^i = F_t(r_t^i) \Leftrightarrow \|F_t(r_t^i)\| > K \quad \text{(Equation 1)}$$

Simply advecting the robots with the flow field to compute the goal positions may lead to undesirable clustering effects since the motion field is generally not divergence free. Consequently, the density of the robots varies, and eventually some regions of the display area might not include robots. In order to restore a visually pleasing, more uniform distribution of robots in the display area, the position of the non-advected robots, is recomputed to a locally optimal-coverage distribution. The Lloyd algorithm iteratively computes a centroidal Voronoi tesselation over the entire set of robots and updates the position of all the robots in the non-advected set to the centroid of their cell. The centroid of each cell is computed as:

$$C^i = \frac{1}{M_{V^i}} \int_{V^i} x \varphi(x) dx \quad \text{(Equation 2)}$$

with given density function $\varphi(x)$ and mass $M_{V^i} = \int_{V^i} \varphi(x) dx$ over the Voronoi cell $V^i$. The density $\varphi(x)$ describes the importance of different areas. In the case of standard centroidal Voronoi tesselation, there is unit density and the mass becomes the area of the Voronoi cell. A weighted centroidal Voronoi distribution may (optionally) be computed if a mask is applied to the input dynamic texture. For example, given by a foreground-background segmentation. Finally the goal position is given by:

$$g_t^i = C^i \Leftrightarrow \|F_t(r_t^i)\| \leq K \quad \text{(Equation 3)}$$

Because the simulator 700 has a full model of the physical constraints arising from robot mechanics and collision avoidance, collisions between the robots will avoided when the computed goal positions are used by the physical controller 705.

For each of the goal positions the corresponding color $I_{t+1}(r_t^i)$ of the pixels in the dynamic texture is sampled by the simulator 700 to compute the desired output colors for the robots. The color is also smoothed via the exponentially moving average. The desired output colors are included in the motion update 720 that is transmitted by the simulator 700 to the physical controller 705.

Given the goal positions and the actual configuration $r_t^i$, the velocity is computed by the predicted position computation unit 730 and smoothed via the exponentially moving average to produce a desired velocity, $\hat{v}_t^i$. The smoothing of the velocity reduces the noise in velocity introduced by the Voronoi relaxation and imperfections in the computed optical flow. After the smoothing, the resulting updated positions $g_t^i$ represent the predicted positions for the next image, frame $I_{t+1}$. The physical controller 705 may also be configured to perform smoothing of the velocity computed for the robots.

The physical swarm and the simulator are updated and synchronized by exchanging the goal positions $g_t^i$ as part of the motion update 710 and the actual positions of the robots $(r_t^i = p_t^i)$ as the actual robot positions 725, as shown in FIG. 7A. The actual robot positions 725 correspond to positions of the robots after the robots have been repositioned based on the previous goal positions.

The process of driving a robot to a goal position is the same in both the virtual swarm in the simulator 700, and in the physical swarm controlled by the physical controller 705. The goal positions are fixed, and the robots are advanced to the goal positions by the robot movement control unit 735 over multiple iterations (time steps). At each iteration, the preferred velocity of each robot is given by $\hat{v}_t^i/N$, where N is the number of iterations. Computed velocities to reach the goals are modified as required for collision avoidance between robots in each iteration, using techniques previously described. Each robot is then advanced for that iteration. The process continues for a fixed number of iterations. The number of iterations remains constant through-out the dynamic texture input.

The simulator 700 contains a virtual robot swarm, including a full model for characteristics of the robot. Collision avoidance is part of the computation performed by the predicted position computation module 730 for the robot motion. Allowing collisions would have a detrimental effect both in slowing the robots, and on the visual representation of the dynamic texture because collisions attract the viewer's attention and looks like a mistake.

The collision free velocity (minimizing the distance to the desired velocity $\hat{v}_t^i$) is obtained via an optimization with linear constraints, one given for each neighboring robot and accounting for the relative velocities that would lead to a collision. To extend the collision avoidance technique to non-holonomic robots, velocities of holonomic robots are mapped to those of the constrained robots to guarantee optimal tracking of the ideal holonomic trajectory within a maximum tracking error $\mathscr{E}$. The mapping is used for reciprocal collision avoidance, meaning that involved robots act mutually and thus share the responsibility to avoid a collision. Setting an aggressiveness factor for each robot may also be supported. Additionally, in one embodiment, robots which are associated with strong optical flow may take precedence over robots associated with weaker optical flows.

Figure 7B:
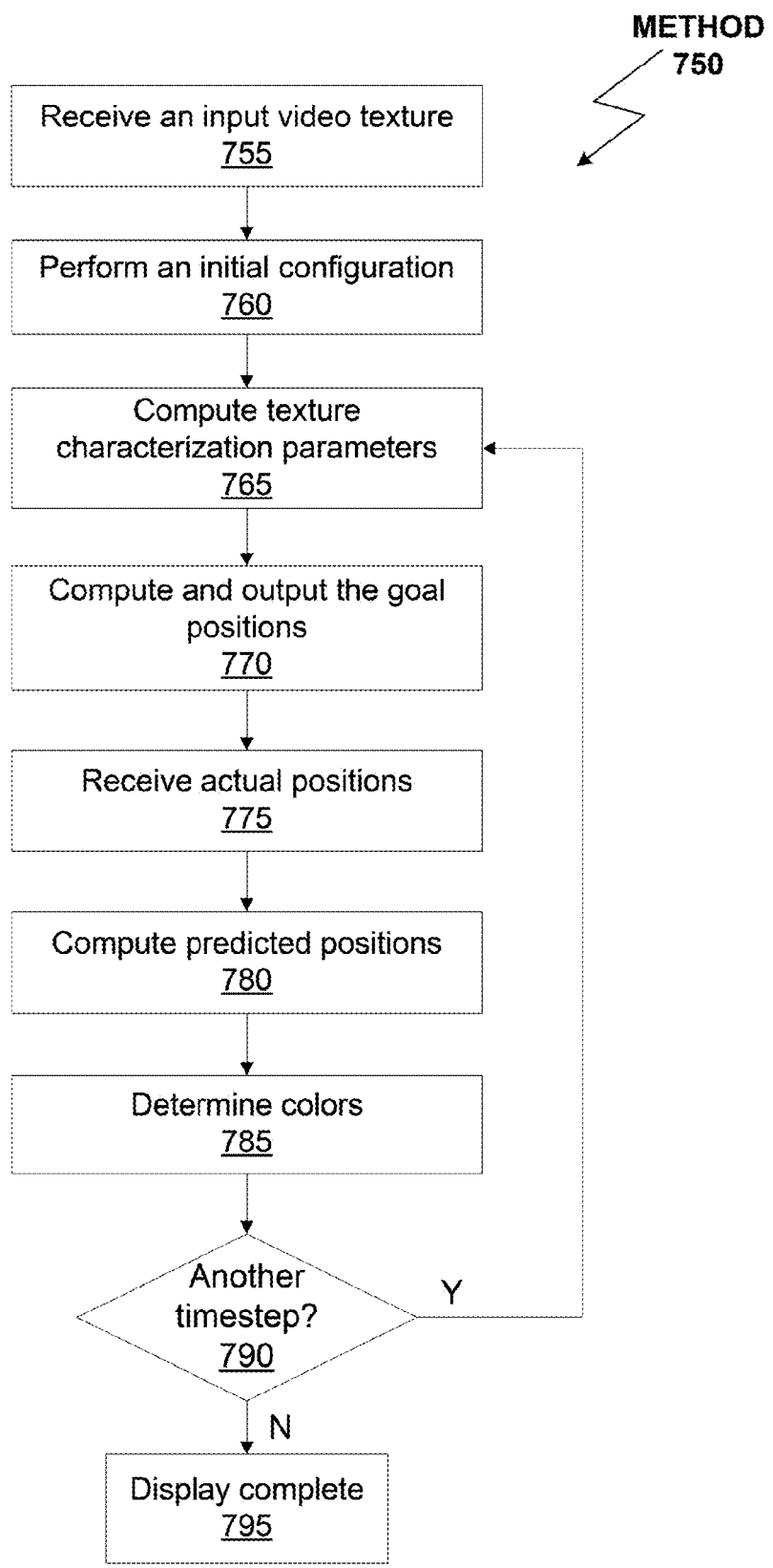
FIG. 7B is a flowchart of method steps describing an algorithm for generating a dynamic texture for display by mobile entities, according to one embodiment of the invention.

FIG. 7B is a flowchart of method steps 750 describing an algorithm for generating a dynamic texture for display by mobile entities (e.g., agents, robots, or other mobile objects), according to one embodiment of the invention. At step 755 the robotic texture system receives an input video texture, e.g., dynamic texture. At step 760 the robotic texture system performs an initial configuration of the mobile entities. Goal positions for the robots are computed for the first frame of the dynamic texture. The goal positions are transmitted by the simulator 700 to the physical controller 705. The actual positions of the robots after the robots are moved according to the goal positions are transmitted from the physical controller 705 to the simulator 700.

At step 765, the texture characterization parameters are computed for a time step by the goal position computation module 710, e.g., using either an optical flow technique or a dynamic texture synthesis technique. At step 770 the goal position computation module 710 computes and outputs the goal positions to the physical controller 705 as the motion update 720. The goal positions are based on the texture characterization parameters and actual positions of the mobile entities and are used to generate a visual representation of the dynamic texture. At step 775 the simulator 700 receives the actual robot positions 725 from the physical controller 705.

At step 780, the predicted position computation module 730 computes the predicted positions based on the goal positions. The predicted positions are estimates of where the simulator 700 expects the robots to be positioned after moving to the goal positions. While the simulator 700 computes the predicted positions of virtual mobile entities, the physical controller 705 may simultaneously compute collision-free velocities to enable the mobile entities to reach the goal positions. In one embodiment, the collision-free velocities for the virtual mobile entities and/or mobile entities are computed using the NH-ORCA algorithm. Each mobile entity independently follows a trajectory at the collision-free velocity for a time step. The physical controller 705 determines if all of the goal positions have been reached by the mobile entities, and, if so, the display of a frame of the visual representation of the dynamic texture is complete. A goal position is considered to have been reached when the current position of the mobile entity assigned to the goal position coincides with the goal position or is within a fixed maximum error value, $\mathscr{E}_i$, of the goal position.

At step 785, the simulator 700 determines and outputs the colors to the physical controller 705. At step 790, the simulator 700 determines if another time step (or frame) is present in the dynamic texture input, and, if so, the simulator 700 returns to step 765. Otherwise, at step 795, generation of the visual representation of the dynamic texture for display by the mobile entities is complete.

In one embodiment, the mobile entities are robots which are able to move in three-dimensional space. For example, robots may fly or adhere to a wall or ceiling. The mobile entities may be capable of sensing the environment and may be configured to react to the environment. The mobile robots with controllable color may generate visual representations of dynamic texture to create an effect like fire, sunlight on water, leaves fluttering in sunlight, a wheat field swaying in the wind, crowd flow in a busy city, and clouds in the sky.

Those skilled in the art will recognize that described systems, devices, components, methods, or algorithms may be implemented using a variety of configurations or steps. No single example described above constitutes a limiting configuration or number of steps. For example, configurations of the system shown in FIG. 1 exist in which the described examples of components therein may be implemented as electronic hardware, computer software, or a combination of both. Illustrative examples have been described above in general terms of functionality. More or less components or steps may be implemented without deviating from the scope of this disclosure. Those skilled in the art will realize varying ways for implementing the described functionality, but such implementation should not be interpreted as a departure from the scope of this disclosure.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

What is claimed is:

1. A method for generating, by mobile entities, a dynamic texture for display, comprising:
   receiving an input dynamic texture comprising a plurality of frames of a dynamic visual image;
   receiving actual positions of the mobile entities;
   computing texture characterization parameters for a time step based on the input dynamic texture, wherein the texture characterization parameters comprise color changes for the mobile entities, the color changes causing the mobile entities to display a visual representation of at least one frame of the dynamic visual image;

computing goal positions for the mobile entities to generate the visual representation, wherein the goal positions are based on the texture characterization parameters and the actual positions of the mobile entities; and providing each one of the goal positions to a physical controller of the mobile entities.

2. The method of claim 1, further comprising:

computing additional texture characterization parameters for an additional time step based on the input dynamic texture; and computing additional goal positions based on the additional texture characterization parameters and additional actual positions of the mobile entities.

3. The method of claim 1, wherein computing the texture characterization parameters comprises performing an optical flow analysis of the input dynamic texture to extract motion and color changes as the texture characterization parameters.

4. The method of claim 1, further comprising:

assigning each of the mobile entities to serve as a respective mobile pixel for displaying the dynamic visual image, wherein the goal positions change a spatial arrangement of the mobile entities relative to each other.

5. The method of claim 1, wherein computing the texture characterization parameters comprises performing dynamic texture synthesis of the input dynamic texture by reducing the input dynamic texture to a low-dimensional representation before extracting motion and color changes as the texture characterization parameters.

6. The method of claim 1, further comprising:

computing a substantially evenly distributed set of initial goal positions for the mobile entities for a first frame of the input dynamic texture; and providing the initial goal positions to the physical controller which moves the mobile entities to the actual positions.

7. The method of claim 1, wherein the mobile entities includes at least one of a non-holonomic robotic element and a holonomic robotic element.

8. The method of claim 1, further comprising, determining a set of colors for display by the mobile entities to generate the dynamic texture for display.

9. The method of claim 1, wherein the mobile entities are robots configured to move in three-dimensional space.

10. The method of claim 1, wherein the mobile entities are configured to sense an environment and react to the environment to generate the visual representation.

11. The method of claim 1, wherein the dynamic texture for display represents at least one of fire, sunlight reflected on water, leaves fluttering in sunlight, a wheat field swaying responsive to wind, crowd flow in a busy city, and clouds in a sky.

12. A non-transitory computer-readable storage medium including instructions that, when executed by a processor, cause the processor to generate a dynamic texture for display by mobile entities, by performing the steps of:

receiving an input dynamic texture comprising a plurality of frames of a dynamic visual image;

receiving actual positions of the mobile entities;

computing texture characterization parameters for a time step based on the input dynamic texture, wherein the texture characterization parameters comprises color changes for the mobile entities, the color changes causing the mobile entities to display a visual representation of at least one frame of the dynamic visual image;

computing goal positions for the mobile entities to generate the visual representation, wherein the goal positions are based on the texture characterization parameters and the actual positions of the mobile entities; and providing each one of the goal positions to a physical controller of the mobile entities.

13. A system for generating a dynamic texture for display by mobile entities, comprising:

a memory that is configured to store instructions for a program; and a processor that is configured to execute the instructions for the program to generate the dynamic texture by performing an operation, the operation comprising:

receiving an input dynamic texture comprising a plurality of frames of a dynamic visual image;

receiving actual positions of the mobile entities, wherein the texture characterization parameters comprise color changes for the mobile entities, the color changes causing the mobile entities to display a visual representation of at least one frame of the dynamic visual image;

computing texture characterization parameters for a time step based on the input dynamic texture;

computing goal positions for the mobile entities to generate the visual representation, wherein the goal positions are based on the texture characterization parameters and the actual positions of the mobile entities; and providing each one of the goal positions to a physical controller of the mobile entities.

14. The system of claim 13, wherein the operation further comprises:

computing additional texture characterization parameters for an additional time step based on the input dynamic texture; and computing additional goal positions based on the additional texture characterization parameters and additional actual positions of the mobile entities.

15. The system of claim 13, wherein computing the texture characterization parameters comprises performing an optical flow analysis of the input dynamic texture to extract motion and color changes as the texture characterization parameters.

16. The system of claim 13, wherein the operation further comprises:

assigning each of the mobile entities to serve as a respective mobile pixel for displaying the dynamic visual image.

17. The method of claim 13, wherein computing the texture characterization parameters comprises performing dynamic texture synthesis of the input dynamic texture by reducing the input dynamic texture to a low-dimensional representation before extracting motion and color changes as the texture characterization parameters.

18. The system of claim 13, wherein the operation further comprises:

computing a substantially evenly distributed set of initial goal positions for the mobile entities for a first frame of the input dynamic texture; and providing the initial goal positions to the physical controller which moves the mobile entities to the actual positions.

19. The system of claim 13, wherein the mobile entities includes at least one of a non-holonomic robotic element and a holonomic robotic element.

20. The system of claim 13, wherein the operation further comprises, determining a set of colors for display by the mobile entities to generate the dynamic texture for display.

* * * * *